United States Patent
Lipkens et al.

(10) Patent No.: US 10,040,011 B2
(45) Date of Patent: Aug. 7, 2018

(54) ACOUSTOPHORETIC MULTI-COMPONENT SEPARATION TECHNOLOGY PLATFORM

(71) Applicant: FLODESIGN SONICS, INC., Wilbraham, MA (US)

(72) Inventors: Bart Lipkens, Hampden, MA (US); Jason Dionne, Simsbury, CT (US); Thomas J. Kennedy, III, Wilbraham, MA (US)

(73) Assignee: FloDesign Sonics, Inc., Wilbraham, MA (US)

( * ) Notice: Subject to any disclaimer, the term of this patent is extended or adjusted under 35 U.S.C. 154(b) by 211 days.

(21) Appl. No.: 13/844,754

(22) Filed: Mar. 15, 2013

(65) Prior Publication Data

US 2013/0284271 A1    Oct. 31, 2013

Related U.S. Application Data

(60) Provisional application No. 61/754,792, filed on Jan. 21, 2013, provisional application No. 61/708,641, filed on Oct. 2, 2012, provisional application No. 61/611,240, filed on Mar. 15, 2012, provisional application No. 61/611,159, filed on Mar. 15, 2012.

(51) Int. Cl.
*B01D 43/00* (2006.01)
*B06B 1/06* (2006.01)

(52) U.S. Cl.
CPC ............ *B01D 43/00* (2013.01); *B06B 1/0644* (2013.01); *Y10T 137/0318* (2015.04); *Y10T 137/794* (2015.04)

(58) Field of Classification Search
CPC combination set(s) only.
See application file for complete search history.

(56) References Cited

U.S. PATENT DOCUMENTS

| | | |
|---|---|---|
| 2,667,944 A | 2/1954 | Crites |
| 3,555,311 A | 1/1971 | Weber |
| 4,055,491 A | 10/1977 | Porath-Furedi |
| 4,158,629 A | 6/1979 | Sawyer |
| 4,165,273 A | 8/1979 | Azarov et al. |
| 4,173,725 A | 11/1979 | Asai et al. |
| 4,204,096 A | 5/1980 | Barcus et al. |

(Continued)

FOREIGN PATENT DOCUMENTS

| | | |
|---|---|---|
| DE | 30 27 433 A1 | 2/1982 |
| EP | 0 292 470 B1 | 11/1988 |

(Continued)

OTHER PUBLICATIONS

Li et al. ("Electromechanical behavior of PZT-brass unimorphs" J. Am. Ceram. Soc., 82, 7, 1999, p. 1733-1740).*

(Continued)

*Primary Examiner* — Krishnan S Menon
*Assistant Examiner* — Ryan B Huang
(74) *Attorney, Agent, or Firm* — Rick Klein, Esq.; Fay Sharp, LLP

(57) ABSTRACT

A system having improved trapping force for acoustophoresis is described where the trapping force is improved by manipulation of the frequency of the ultrasonic transducer. The transducer includes a ceramic crystal. The crystal may be directly exposed to fluid flow. The crystal may be air backed, resulting in a higher Q factor.

22 Claims, 19 Drawing Sheets

(56) References Cited

U.S. PATENT DOCUMENTS

| | | | |
|---|---|---|---|
| 4,398,325 A | 8/1983 | Piaget et al. | |
| 4,666,595 A | 5/1987 | Graham | |
| 4,699,588 A | 10/1987 | Zinn et al. | |
| 4,743,361 A | 5/1988 | Schram | |
| 4,759,775 A | 7/1988 | Peterson et al. | |
| 4,983,189 A | 1/1991 | Peterson et al. | |
| 5,225,089 A | 7/1993 | Benes et al. | |
| 5,371,429 A | 12/1994 | Manna | |
| 5,371,729 A | 12/1994 | Manna | |
| 5,395,592 A | 3/1995 | Bolleman et al. | |
| 5,431,817 A | 7/1995 | Braatz et al. | |
| 5,443,985 A | 8/1995 | Lu et al. | |
| 5,452,267 A * | 9/1995 | Spevak | 367/163 |
| 5,484,537 A | 1/1996 | Whitworth | |
| 5,527,460 A * | 6/1996 | Trampler et al. | 210/198.1 |
| 5,560,362 A | 10/1996 | Sliwa, Jr. et al. | |
| 5,594,165 A | 1/1997 | Madanshetty | |
| 5,604,301 A | 2/1997 | Mountford et al. | |
| 5,626,767 A | 5/1997 | Trampler et al. | |
| 5,688,405 A | 11/1997 | Dickinson et al. | |
| 5,711,888 A | 1/1998 | Trampler et al. | |
| 5,831,166 A | 11/1998 | Kozuka et al. | |
| 5,902,489 A | 5/1999 | Yasuda et al. | |
| 5,912,182 A | 6/1999 | Coakley et al. | |
| 5,951,456 A | 9/1999 | Scott | |
| 6,090,295 A | 6/2000 | Raghavarao et al. | |
| 6,166,231 A | 12/2000 | Hoeksema | |
| 6,216,538 B1 | 4/2001 | Yasuda et al. | |
| 6,205,848 B1 | 6/2001 | Faber et al. | |
| 6,332,541 B1 * | 12/2001 | Coakley | B01J 19/10 |
| | | | 209/160 |
| 6,391,653 B1 | 5/2002 | Letcher et al. | |
| 6,487,095 B1 | 11/2002 | Malik et al. | |
| 6,592,821 B1 | 7/2003 | Wada et al. | |
| 6,649,069 B2 | 11/2003 | DeAngelis | |
| 6,763,722 B2 | 7/2004 | Fjield et al. | |
| 6,881,314 B1 | 4/2005 | Wang et al. | |
| 6,929,750 B2 | 8/2005 | Laurell et al. | |
| 6,936,151 B1 | 8/2005 | Lock et al. | |
| 7,010,979 B2 | 3/2006 | Scott | |
| 7,061,163 B2 | 6/2006 | Nagahara et al. | |
| 7,081,192 B1 | 7/2006 | Wang et al. | |
| 7,093,482 B2 | 8/2006 | Berndt | |
| 7,108,137 B2 | 9/2006 | Lal et al. | |
| 7,150,779 B2 | 12/2006 | Meegan, Jr. | |
| 7,186,502 B2 | 3/2007 | Vesey | |
| 7,191,787 B1 | 3/2007 | Redeker et al. | |
| 7,331,233 B2 | 2/2008 | Scott | |
| 7,340,957 B2 | 3/2008 | Kaduchak et al. | |
| 7,373,805 B2 | 5/2008 | Hawkes et al. | |
| 7,541,166 B2 | 6/2009 | Belgrader et al. | |
| 7,601,267 B2 | 10/2009 | Haake et al. | |
| 7,673,516 B2 | 3/2010 | Janssen et al. | |
| 7,837,040 B2 | 11/2010 | Ward et al. | |
| 7,846,382 B2 | 12/2010 | Strand et al. | |
| 7,968,049 B2 | 6/2011 | Takahashi et al. | |
| 8,080,202 B2 | 12/2011 | Takahashi et al. | |
| 8,256,076 B1 | 9/2012 | Feller | |
| 8,266,950 B2 | 9/2012 | Kaduchak et al. | |
| 8,273,253 B2 | 9/2012 | Curran | |
| 8,273,302 B2 | 9/2012 | Takahashi et al. | |
| 8,309,408 B2 | 11/2012 | Ward et al. | |
| 8,319,398 B2 | 11/2012 | Vivek et al. | |
| 8,334,133 B2 | 12/2012 | Fedorov et al. | |
| 8,387,803 B2 | 3/2013 | Thorslund et al. | |
| 8,679,338 B2 | 3/2014 | Rietman et al. | |
| 2002/0134734 A1 | 9/2002 | Campbell et al. | |
| 2003/0015035 A1 | 1/2003 | Kaduchak et al. | |
| 2003/0028108 A1 * | 2/2003 | Miller | 600/437 |
| 2003/0195496 A1 | 10/2003 | Maguire | |
| 2003/0209500 A1 | 11/2003 | Kock et al. | |
| 2003/0230535 A1 | 12/2003 | Affeld et al. | |
| 2004/0016699 A1 | 1/2004 | Bayevsky | |
| 2005/0121269 A1 * | 6/2005 | Namuduri | 188/267.1 |
| 2005/0196725 A1 | 9/2005 | Fu | |
| 2006/0037915 A1 * | 2/2006 | Strand | B01D 21/283 |
| | | | 210/748.05 |
| 2007/0272618 A1 | 11/2007 | Gou et al. | |
| 2007/0284299 A1 | 12/2007 | Xu et al. | |
| 2008/0217259 A1 | 9/2008 | Siversson | |
| 2009/0029870 A1 | 1/2009 | Ward et al. | |
| 2009/0053686 A1 | 2/2009 | Ward et al. | |
| 2009/0098027 A1 | 4/2009 | Tabata et al. | |
| 2009/0178716 A1 | 7/2009 | Kaduchak et al. | |
| 2009/0194420 A1 | 8/2009 | Mariella, Jr. et al. | |
| 2009/0045107 A1 | 12/2009 | Ward et al. | |
| 2009/0295505 A1 | 12/2009 | Mohammadi et al. | |
| 2010/0000945 A1 | 1/2010 | Gavalas | |
| 2010/0078384 A1 | 4/2010 | Yang | |
| 2010/0124142 A1 | 5/2010 | Laugharn et al. | |
| 2010/0192693 A1 | 8/2010 | Mudge et al. | |
| 2010/0193407 A1 | 8/2010 | Steinberg et al. | |
| 2010/0206818 A1 | 8/2010 | Leong et al. | |
| 2010/0255573 A1 | 10/2010 | Bond et al. | |
| 2010/0317088 A1 | 12/2010 | Radaelli et al. | |
| 2010/0323342 A1 | 12/2010 | Gonzalez Gomez et al. | |
| 2010/0330633 A1 | 12/2010 | Walther et al. | |
| 2011/0024335 A1 | 2/2011 | Ward et al. | |
| 2011/0092726 A1 | 4/2011 | Clarke | |
| 2011/0123392 A1 | 5/2011 | Dionne et al. | |
| 2011/0154890 A1 | 6/2011 | Holm et al. | |
| 2011/0166551 A1 | 7/2011 | Schafer | |
| 2011/0262990 A1 | 10/2011 | Wang et al. | |
| 2011/0278218 A1 | 11/2011 | Dionne et al. | |
| 2011/0281319 A1 | 11/2011 | Swayze et al. | |
| 2011/0309020 A1 | 12/2011 | Rietman et al. | |
| 2012/0088295 A1 | 4/2012 | Yasuda et al. | |
| 2012/0163126 A1 | 6/2012 | Campbell et al. | |
| 2012/0328477 A1 | 12/2012 | Dionne et al. | |
| 2012/0329122 A1 | 12/2012 | Lipkens et al. | |
| 2013/0175226 A1 * | 7/2013 | Coussios et al. | 210/748.05 |
| 2013/0277316 A1 | 10/2013 | Dutra et al. | |
| 2013/0284271 A1 | 10/2013 | Lipkens et al. | |
| 2014/0011240 A1 | 1/2014 | Lipkens et al. | |

FOREIGN PATENT DOCUMENTS

| | | |
|---|---|---|
| EP | 1 254 669 B1 | 11/2002 |
| GB | 2 420 510 A | 5/2006 |
| RU | 2085933 | 7/1997 |
| SU | 629496 | 10/1978 |
| WO | WO 1987/07178 A1 | 12/1987 |
| WO | WO 97/34643 | 9/1997 |
| WO | WO 98/50133 | 11/1998 |
| WO | WO 02/072234 A1 | 9/2002 |
| WO | WO 2009/111276 A1 | 9/2009 |
| WO | WO 2009/144709 A1 | 12/2009 |
| WO | WO 2010/024753 A1 | 3/2010 |
| WO | WO 2010/024753 A1 | 4/2010 |
| WO | WO 2011/023949 A2 | 3/2011 |
| WO | WO 2011/027146 A2 | 3/2011 |
| WO | WO 2011/161463 A2 | 12/2011 |
| WO | WO 2011161463 A2 * | 12/2011 |
| WO | WO 2014/014941 | 1/2014 |

OTHER PUBLICATIONS

International Search Report dated Feb. 18, 2014 in corresponding PCT Application No. PCT/US2013/059640.

International Search Report and Written Opinion of International Application No. PCT/US2013/032705 dated Jul. 26, 2013.

J. Nilsson et al., "Review of cell and particle trapping in microfluidic systems," Department of Measurement Technology and Industrial Electrical Engineering, Div. of Nanobiotechnology, Lund University, P.O. Box 118. Lund, Sweden, Analytica Chimica Acta 649, Jul. 14, 2009, pp. 141-157.

Martyn Hill et al., "Ultrasonic Particle Manipulation," Microfluidic Technologies for Miniaturized Analysis Systems, Jan. 2007, pp. 359-378.

European Search Report of European Application No. 13760840.2 dated Jan. 22, 2016.

Alvarez et al.; Shock Waves, vol. 17, No. 6, pp. 441-447, 2008.

(56) References Cited

OTHER PUBLICATIONS

Benes et al.; Ultrasonic Separation of Suspended Particles, 2001 IEEE Ultrasonics Symposium; Oct. 7-10, 2001; pp. 649-659; Atlanta, Georgia.
Castro; Tunable gap and quantum quench dynamics in bilayer graphene; Jul. 13, 2010; Mathematica Summer School.
Cravotto et al.; Ultrasonics Sonochemistry, vol. 15, No. 5, pp. 898-902, 2008.
Garcia-Lopez, et al; Enhanced Acoustic Separation of Oil-Water Emulsion in Resonant Cavities. The Open Acoustics Journal. 2008, vol. 1, pp. 66-71.
Hill et al.; Ultrasonic Particle Manipulation; Microfluidic Technologies for Miniaturized Analysis Systems, Jan. 2007, pp. 359-378.
Kuznetsova et al.; Microparticle concentration in short path length ultrasonic resonators: Roles of radiation pressure and acoustic streaming; Journal of the Acoustical Society of America, American Institute of Physics for the Acoustical Society of America, vol. 116, No. 4, Oct. 1, 2004, pp. 1956-1966, DOI: 1.1121/1.1785831.
Latt et al.; Ultrasound-membrane hybrid processes for enhancement of filtration properties; Ultrasonics sonochemistry 13.4 (2006): 321-328.
Lipkens et al.; Frequency sweeping and fluid flow effects on particle trajectories in ultrasonic standing waves; Acoustics 08, Paris, Jun. 29-Jul. 4, 2008.
Lipkens et al.; Prediction and measurement of particle velocities in ultrasonic standing waves; J. Acoust. Soc. Am., 124 No. 4, pp. 2492 (A) 2008.
Lipkens et al.; Separation of micron-sized particles in macro-scale cavities by ultrasonic standing waves; Presented at the International Congress on Ultrasonics, Santiago; Jan. 11-17, 2009.
Lipkens et al.; The effect of frequency sweeping and fluid flow on particle trajectories in ultrasonic standing waves; IEEE Sensors Journal, vol. 8, No. 6, pp. 667-677, 2008.
Lipkens et al., Macro-scale acoustophoretic separation of lipid particles from red blood cells, The Journal of the Acoustical Society of America, vol. 133, Jun. 2, 2013, p. 045017, XP055162509, New York, NY.
Meribout et a.; An Industrial-Prototype Acoustic Array for Real-Time Emulsion Layer Detection in Oil Storage Tanks; IEEE Sensors Journal, vol. 9, No. 12, Dec. 2009.
Nilsson et al.; Review of cell and particle trapping in microfluidic systems; Department of Measurement Technology and Industrial Electrical Engineering, Div. of Nanobiotechnology, Lund University, P.O. Box 118. Lund, Sweden, Analytica Chimica Acta 649, Jul. 14, 2009, pp. 141-157.
Pangu et al.; Droplet transport and coalescence kinetics in emulsions subjected to acoustic fields; Ultrasonics 46, pp. 289-302 (2007).
Ponomarenko et al.; Density of states and zero Landau level probed through capacitance of graphene; Nature Nanotechnology Letters, Jul. 5, 2009; DOI: 10.1038/NNANO.2009.177.
Seymour et al, J. Chem. Edu., 1990, 67(9), p. 763, published Sep. 1990.
Annex to Form PCT/ISA/206—Communication Relating to the Results of the Partial International Search Report, dated Jul. 18, 2013.
European Search Report of European Application No. 11769474.5 dated Oct. 10, 2012.
International Search Report and Written Opinion dated Dec. 20, 2011, for corresponding PCT application No. PCT/US2011/032181.
International Search Report and Written Opinion dated Feb. 27, 2012, for PCT application No. PCT/US2011/040787.
International Search Report and Written Opinion of International Application No. PCT/US2013/037404 dated Jun. 21, 2013.
International Search Report and Written Opinion of International Application No. PCT/US2013/050729 dated Sep. 25, 2013.
International Search Report for corresponding PCT Application Serial No. PCT/US2014/015382 dated May 6, 2014.
phys. org. "Engineers develop revolutionary nanotech water desalination membrane." Nov. 6, 2006. http://phys.org/news82047372.html.
"Proceedings of the Acoustics 2012 Nantes Conference," Apr. 23-27, 2012, Nantes, France, pp. 278-282.
Sony New Release: <http://www.sony.net/SonyInfo/News/Press/201010/10-137E/index.html>.
Extended European Search Report for European Application No. 13844181.1 dated Sep. 6, 2016.
Decision on Grant for Russian Application No. 2014141372 dated Sep. 13, 2016.

* cited by examiner 54    50         64

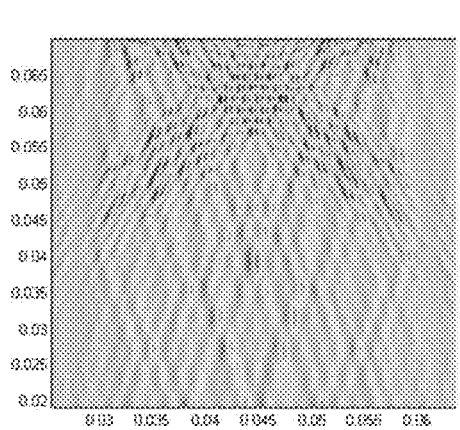 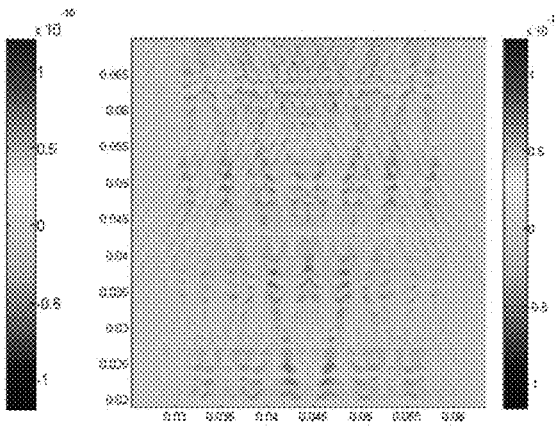
Fig. 11            Fig. 12
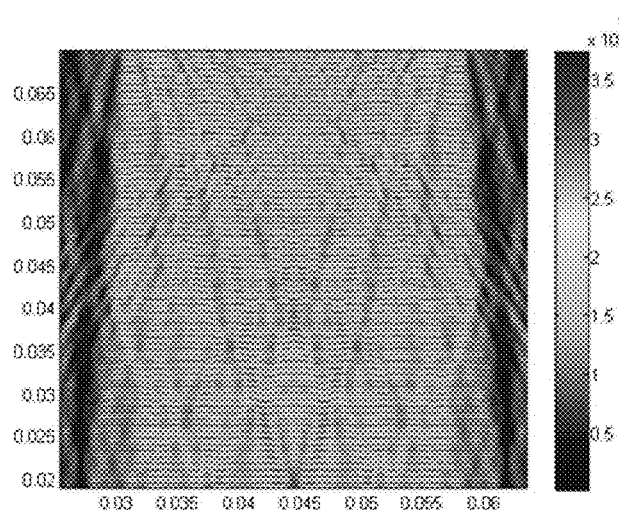
Fig. 13

ACOUSTOPHORETIC MULTI-COMPONENT SEPARATION TECHNOLOGY PLATFORM

This application claims the benefit of U.S. Provisional Patent Application Ser. No. 61/708,641, filed on Oct. 2, 2012. The present application also claims the benefit of U.S. Provisional Patent Application Ser. No. 61/611,159, filed Mar. 15, 2012, and of U.S. Provisional Patent Application Ser. No. 61/611,240, also filed Mar. 15, 2012, and of U.S. Provisional Patent Application Ser. No. 61/754,792, filed Jan. 21, 2013. These four applications are incorporated herein by reference in their entireties.

BACKGROUND

Acoustophoresis is the separation of particles using high intensity sound waves. It has long been known that high intensity standing waves of sound can exert forces on particles. A standing wave has a pressure profile which appears to "stand" still in time. The pressure profile in a standing wave varies from areas of high pressure (nodes) to areas of low pressure (anti-nodes). Standing waves are produced in acoustic resonators. Common examples of acoustic resonators include many musical wind instruments such as organ pipes, flutes, clarinets, and horns.

Efficient separation technologies for multi-component liquid streams that eliminate any waste and reduce the required energy, thereby promoting a sustainable environment, are needed.

BRIEF DESCRIPTION

The present disclosure relates to systems and devices for acoustophoresis on a large scale. The devices use an ultrasonic transducer as described herein. The transducer is driven at frequencies that produce multiple standing waves.

In some embodiments, an apparatus including a flow chamber with an inlet and an outlet through which is flowed a mixture of a host fluid and at least one of a second fluid and a particulate is disclosed. An ultrasonic transducer embedded in a wall of said flow chamber or located outside the flow chamber wall is driven by an oscillating, periodic, or pulsed voltage signal of ultrasonic frequencies which drives the transducer in a higher order mode of vibration to create standing waves in the flow channel. The transducer includes a ceramic crystal. A reflector is located on the wall on the opposite side of the flow chamber from the transducer.

In other embodiments, a method of separating a host fluid from at least one of a second fluid and a particulate is disclosed. The method comprises flowing the host fluid into a flow chamber having a resonator and a collection pocket and driving a transducer with an oscillating, periodic, or pulsed voltage signal to create standing waves in the resonator and collect the at least one of the second fluid and particulate in the collection pocket.

In yet other embodiments, an apparatus comprises a flow chamber with an inlet and an outlet through which is flowed a mixture of a host fluid and at least one of a second fluid and a particulate. A plurality of ultrasonic transducers are embedded in a wall of said flow chamber or located outside the flow chamber wall. The transducers each include a ceramic crystal driven by an oscillating, periodic, or pulsed voltage signal of ultrasonic frequencies which drives the transducers in a higher order mode of vibration to create standing waves in the flow channel. A reflector is located on the wall on the opposite side of the flow chamber from the transducers.

These and other non-limiting characteristics are more particularly described below.

BRIEF DESCRIPTION OF THE DRAWINGS

The following is a brief description of the drawings, which are presented for the purposes of illustrating the exemplary embodiments disclosed herein and not for the purposes of limiting the same.

FIG. 11 shows the lateral (horizontal) acoustic radiation force at 1.9964 MHz.

FIG. 12 shows the axial (vertical) component for a resonance frequency of 1.9964 MHz.

FIG. 13 shows the acoustic pressure amplitude at 1.9964 MHz.

DETAILED DESCRIPTION

Figure 1:
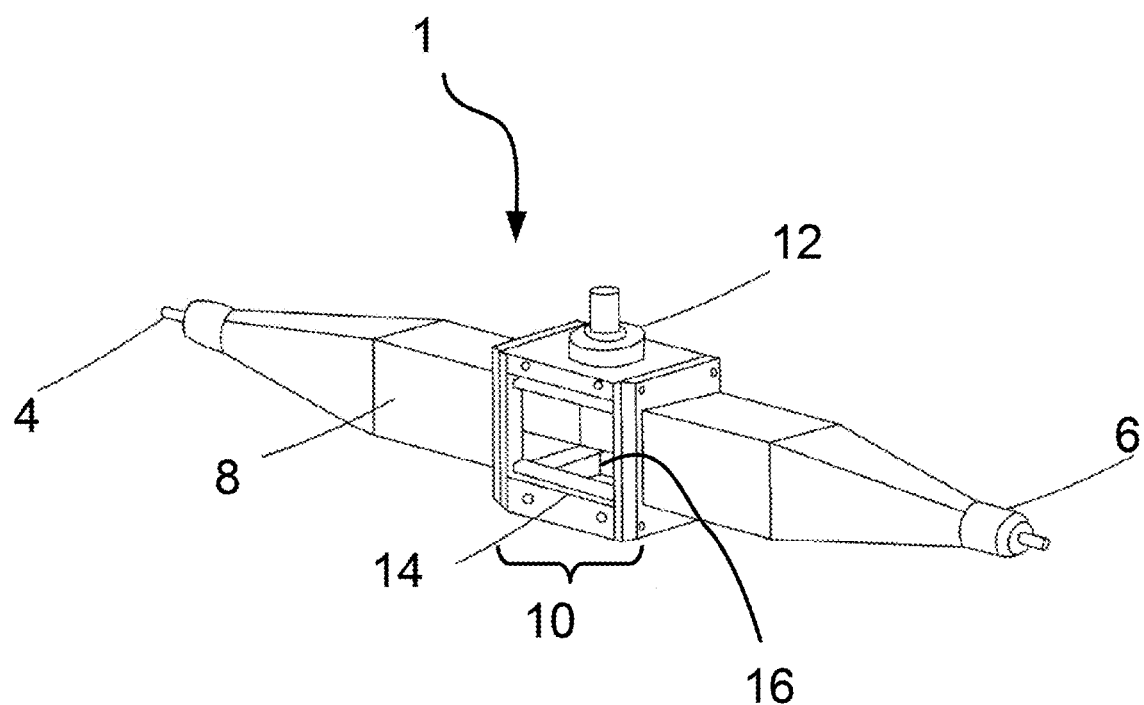
FIG. 1 shows an acoustophoretic separator having one transducer.

The present disclosure may be understood more readily by reference to the following detailed description of desired embodiments and the examples included therein. In the following specification and the claims which follow, reference will be made to a number of terms which shall be defined to have the following meanings.

The singular forms "a," "an," and "the" include plural referents unless the context clearly dictates otherwise.

As used in the specification and in the claims, the term "comprising" may include the embodiments "consisting of" and "consisting essentially of."

Numerical values should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 grams to 10 grams" is inclusive of the endpoints, 2 grams and 10 grams, and all the intermediate values). The endpoints of the ranges and any values disclosed herein are not limited to the precise range or value; they are sufficiently imprecise to include values approximating these ranges and/or values.

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases. In at least some instances, the approximating language may correspond to the precision of an instrument for measuring the value. The modifier "about" should also be considered as disclosing the range defined by the absolute values of the two endpoints. For example, the expression "from about 2 to about 4" also discloses the range "from 2 to 4."

Efficient separation technologies for multi-component liquid streams that eliminate any waste and reduce the required energy, and therefore promote a sustainable environment, are needed. Large volume flow rate acoustophoretic phase separator technology using ultrasonic standing waves provides the benefit of having no consumables, no generated waste, and a low cost of energy. The technology is efficient at removal of particles of greatly varying sizes, including separation of micron and sub-micron sized particles. Examples of acoustic filters/collectors utilizing acoustophoresis can be found in commonly owned U.S. patent application Ser. Nos. 12/947,757; 13/085,299; 13/216,049; and 13/216,035, the entire contents of each being hereby fully incorporated by reference.

The platform technology described herein provides an innovative solution that includes a large volume flow rate acoustophoretic phase separator based on ultrasonic standing waves with the benefit of having no consumables, no generated waste, and a low cost of energy. Acoustophoresis is a low-power, no-pressure-drop, no-clog, solid-state approach to particle removal from fluid dispersions: i.e., it is used to achieve separations that are more typically performed with porous filters, but it has none of the disadvantages of filters. In particular, the present disclosure provides systems that operate at the macro-scale for separations in flowing systems with high flow rates. The acoustic resonator is designed to create a high intensity three dimensional ultrasonic standing wave that results in an acoustic radiation force that is larger than the combined effects of fluid drag and buoyancy, and is therefore able to trap, i.e., hold stationary, the suspended phase. The present systems have the ability to create ultrasonic standing wave fields that can trap particles in flow fields with linear velocity exceeding 1 cm/s. This technology offers a green and sustainable alternative for separation of secondary phases with a significant reduction in cost of energy. Excellent particle separation efficiencies have been demonstrated for particle sizes as small as one micron.

The acoustophoretic separation technology employs ultrasonic standing waves to trap, i.e., hold stationary, secondary phase particles in a host fluid stream. This is an important distinction from previous approaches where particle trajectories were merely altered by the effect of the acoustic radiation force. The scattering of the acoustic field off the particles results in a three dimensional acoustic radiation force, which acts as a three-dimensional trapping field. The acoustic radiation force is proportional to the particle volume (e.g. the cube of the radius). It is proportional to frequency and the acoustic contrast factor. It also scales with acoustic energy (e.g. the square of the acoustic pressure amplitude). The sinusoidal spatial variation of the force is what drives the particles to the stable positions of the standing waves. When the acoustic radiation force exerted on the particles is stronger than the combined effect of fluid drag force and buoyancy/gravitational force, the particle is trapped within the acoustic standing wave field. The action of the acoustic forces on the trapped particles results in concentration, agglomeration and/or coalescence of particles and droplets. Heavier-than-water (i.e. denser than water) particles are separated through enhanced gravitational settling, and lighter-than-water particles are separated through enhanced buoyancy.

Efficient and economic particle separation processes can be useful in many areas of energy generation, e.g., producing water, hydro-fracking, and bio-fuels, e.g, harvesting and dewatering. Acoustophoretic technology can be used to target accelerated capture of bacterial spores in water, oil-recovery, and dewatering of bio-oil derived from micro-algae. Current technology used in the oil recovery field does not perform well in recovery of small, i.e., less than 20 micron, oil droplets. However, the acoustophoretic systems described herein can enhance the capture and coalescence of small oil droplets, thereby shifting the particle size distribution resulting in an overall increased oil capture. To be useful, it is generally necessary to demonstrate large flow rates at a level of 4 gallons per minute (GPM). Another goal is the increased capture of oil droplets with a diameter of less than 20 microns.

Acoustophoretic separation can also be used to aid such applications as advanced bio-refining technology to convert low-cost readily available non-food biomass (e.g. municipal solid waste and sewage sludge) into a wide array of chemicals and secondary alcohols that can then be further refined into renewable gasoline, jet fuel, or diesel. A water treatment technology is used to de-water the fermentation broth and isolate valuable organic salts for further processing into fuels. The dewatering process is currently done through an expensive and inefficient ultra-filtration method that suffers from frequent fouling of the membranes, a relatively low concentration factor, and a high capital and operating expense. Acoustophoretic separation can filter out particles with an incoming particle size distribution that spans more than three orders of magnitude, namely from 600 microns to 0.3 microns, allowing improvements in the concentration of the separated broth with a lower capital and operational expense.

Acoustophoretic separation is also useful for the harvesting, oil-recovery, and dewatering of micro-algae for conversion into bio-oil. Current harvesting, oil recovery, and dewatering technologies for micro-algae suffer from high operational and capital expenses. Current best estimates put the price of a barrel of bio-oil derived from micro-algae at a minimum of $200.00 per barrel. There is a need in the art of micro-algae biofuel for technologies that improve harvesting, oil-recovery, and dewatering steps of this process. Acoustophoretic separation technology meets this need.

Some other applications are in the areas of wastewater treatment, grey water recycling, and water production. Other applications are in the area of life sciences and medical applications, such as the separation of lipids from red blood cells. This can be of critical importance during cardiopulmonary bypass surgery, which involves suctioning shed mediastinal blood. Lipids are unintentionally introduced to the bloodstream when blood is re-transfused to the body. Lipid micro-emboli can travel to the brain and cause various neuro-cognitive disorders. Therefore, there is a need to cleanse the blood. Existing methods are currently inefficient or harmful to red blood cells.

Particular embodiments focus on the capture and growth of sub 20 micron oil droplets. At least 80% of the volume of sub-20-micron droplets are captured and then grown to droplets that are bigger than 20 microns. The process involves the trapping of the oil droplets in the acoustic standing wave, coalescence of many small trapped droplets, and eventually release of the larger droplets when the acoustic trapping force becomes smaller than the buoyancy force.

Advanced multi-physics and multiple length scale computer models and high frequency (MHz), high-power, and high-efficiency ultrasonic drivers with embedded controls have been combined to arrive at new designs of acoustic resonators driven by arrays of piezoelectric transducers, resulting in acoustophoretic separation devices that far surpass current capabilities.

Desirably, such transducers provide a transverse force to accompany the axial force so as to increase the particle trapping capabilities of a acoustophoretic system.

A schematic representation of one embodiment of an acoustophoretic particle separator 1 is shown in FIG. 1. A multi-component liquid stream (e.g. water or other fluid) enters the inlet 4 and separated fluid exits at the opposite end via outlet 6. It should be noted that this liquid stream is usually under pressure when flowing through the separator. The particle separator 1 has a longitudinal flow channel 8 that carries the multi-component liquid stream and passes through a resonator 10. The resonator 10 includes a transducer 12 or, in some embodiments, an array of transducers, which acts as an excitation source of acoustic waves. The acoustic resonator 10 has a reflector 14, which is located on the wall opposite the transducer 12. A collection pocket 16 collects impurities, and is also located opposite the transducer. As defined herein, impurities includes particles or fluids distinct from the host fluid. The acoustic resonator 10 is designed to maintain a high intensity three-dimensional acoustic standing wave. The system is driven by a function generator and amplifier (not shown). The system performance is monitored and controlled by a computer.

Figure 2:
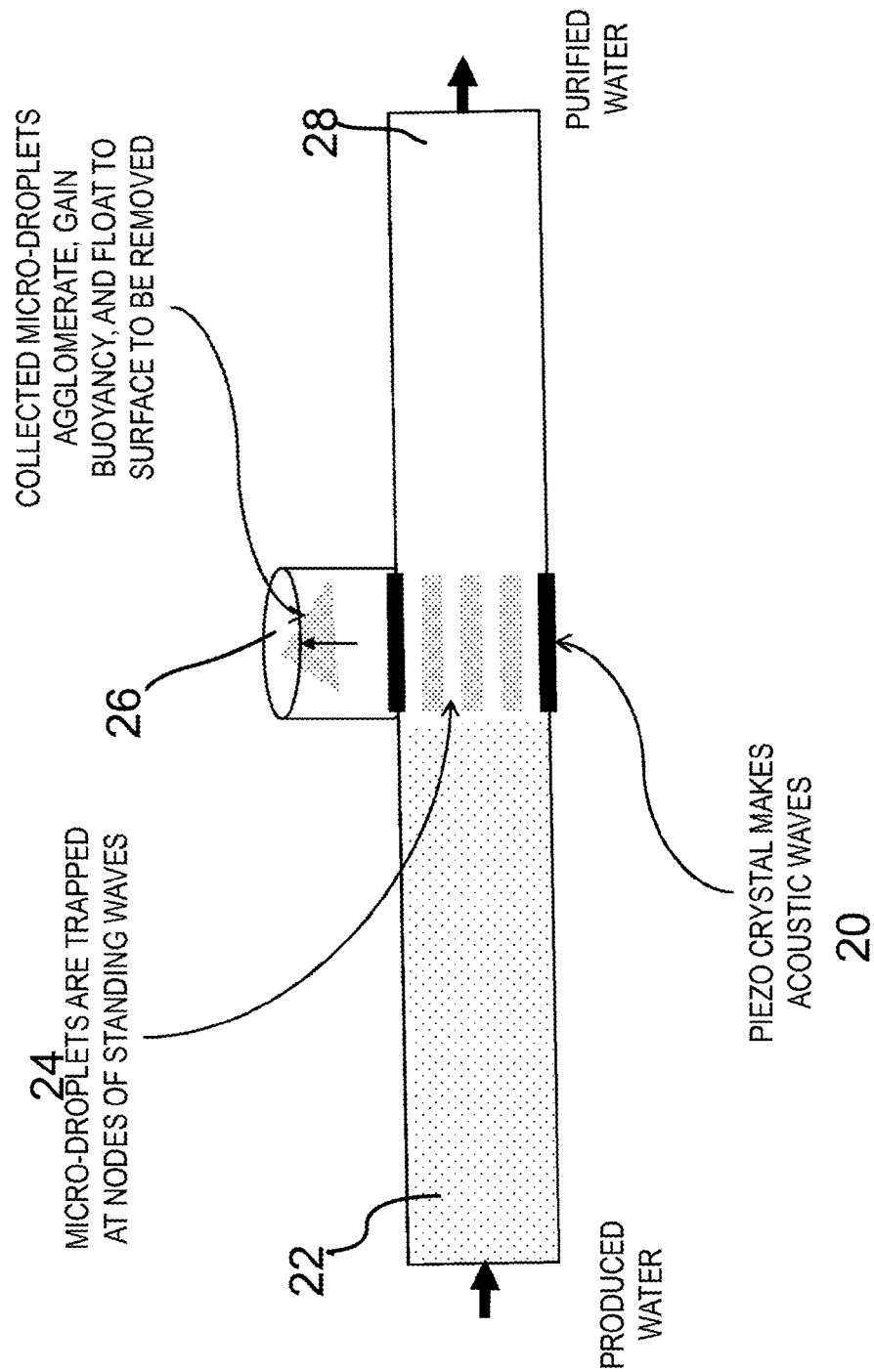
FIG. 2 is a diagram illustrating the function of an acoustophoretic separator.

A diagrammatic representation of an embodiment for removing oil or other lighter-than-water material is shown in FIG. 2. Excitation frequencies typically in the range from 100s of kHz to several MHz are applied by transducer 20. Microdroplets 22 are trapped at standing waves 24, agglomerate, and, in the case of buoyant material, float to the surface and are discharged via an effluent outlet 26. Purified water is discharged at outlet 28. The acoustophoretic separation technology can accomplish multi-component particle separation without any fouling at a much reduced cost.

Figure 3:
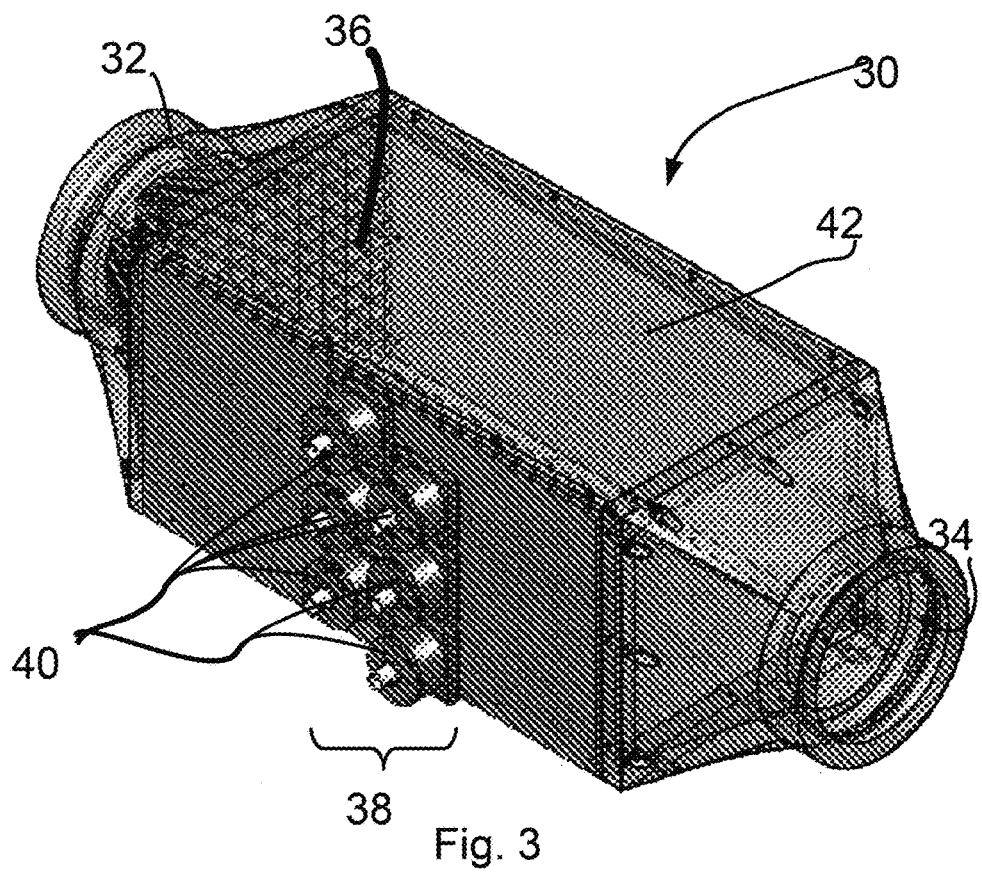
FIG. 3 shows an acoustophoretic separator having a plurality of transducers.

FIG. 3 shows another embodiment of an acoustophoretic particle separator 30. Like acoustophoretic separator 1, acoustophoretic separator 30 has an inlet 32 and an outlet 34. The inlet 32 is fitted with a nozzle or diffuser 90 having a honeycomb 95 to facilitate the development of plug flow. The acoustophoretic separator 30 has an array 38 of transducers 40, in this case six transducers all arranged on the same wall. The transducers are arranged so that they cover the entire cross-section of the flowpath. The acoustophoretic separation system of FIG. 3 has, in certain embodiments, a square cross section of 6 inches×6 inches which operates at flow rates of up to 3 gallons per minute (GPM), or a linear velocity of 8 mm/sec. The transducers 40 are six PZT-8 (Lead Zirconate Titanate) transducers with a 1 inch diameter and a nominal 2 MHz resonance frequency. Each transducer consumes about 28 W of power for droplet trapping at a flow rate of 3 GPM. This translates in an energy cost of 0.25 kW hr/m$^3$. This is an indication of the very low cost of energy of this technology. Desirably, each transducer is powered and controlled by its own amplifier.

Figures 4A, 4B:
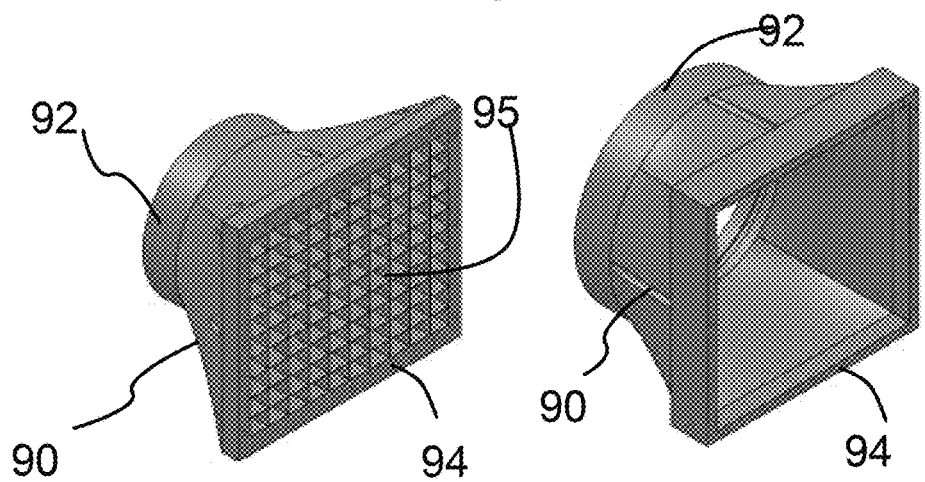
FIG. 4A is a detail view of a diffuser used as an inlet in the separator of FIG. 3.
FIG. 4B is a detail view of an alternate inlet diffuser that can be used with the separator of FIG. 3.

FIG. 4A and FIG. 4B show two different diffusers that can be used at the inlet of the acoustophoretic separator. The diffuser 90 has an entrance 92 (here with a circular shape) and an exit 94 (here with a square shape). The diffuser of FIG. 4A is illustrated in FIG. 3. FIG. 4A includes a grid or honeycomb 95, whereas FIG. 4B does not. The grid helps ensure uniform flow.

Figure 5:
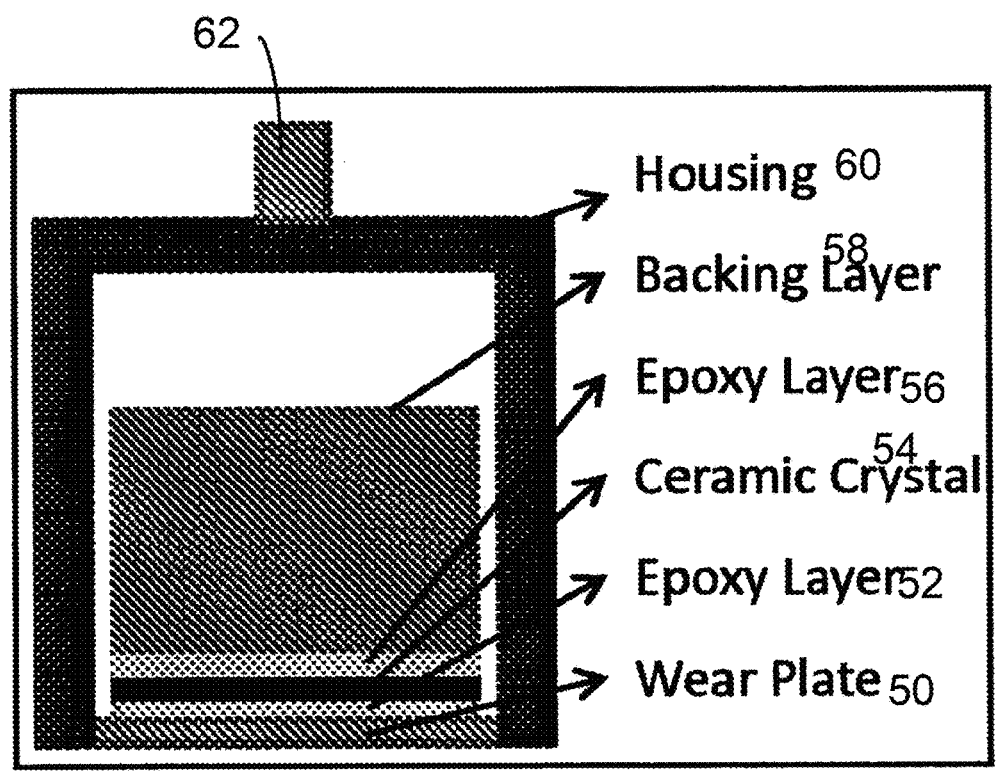
FIG. 5 is a cross-sectional diagram of a conventional ultrasonic transducer.

FIG. 5 is a cross-sectional diagram of a conventional ultrasonic transducer. This transducer has a wear plate 50 at a bottom end, epoxy layer 52, ceramic crystal 54 (made of, e.g. PZT), an epoxy layer 56, and a backing layer 58. The epoxy layer 56 attaches backing layer 58 to the crystal 54. The entire assembly is contained in a housing 60 which may be made out of, for example, aluminum. A connector 62 provides connection for wires to pass through the housing and connect to leads (not shown) which attach to the crystal 54.

Figure 6:
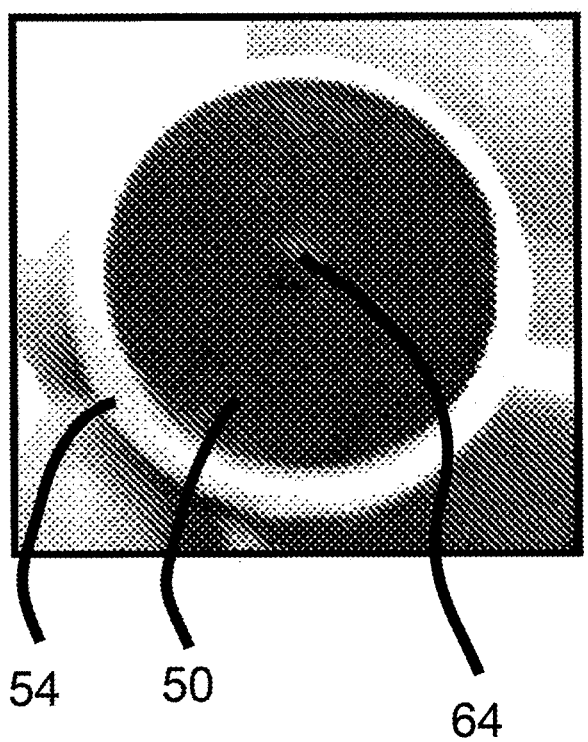
FIG. 6 is a picture of a wear plate of a conventional transducer.

FIG. 6 is a photo of a wear plate 50 with a bubble 64 where the wear plate has pulled away from the ceramic crystal surface due to the oscillating pressure.

Figure 7:
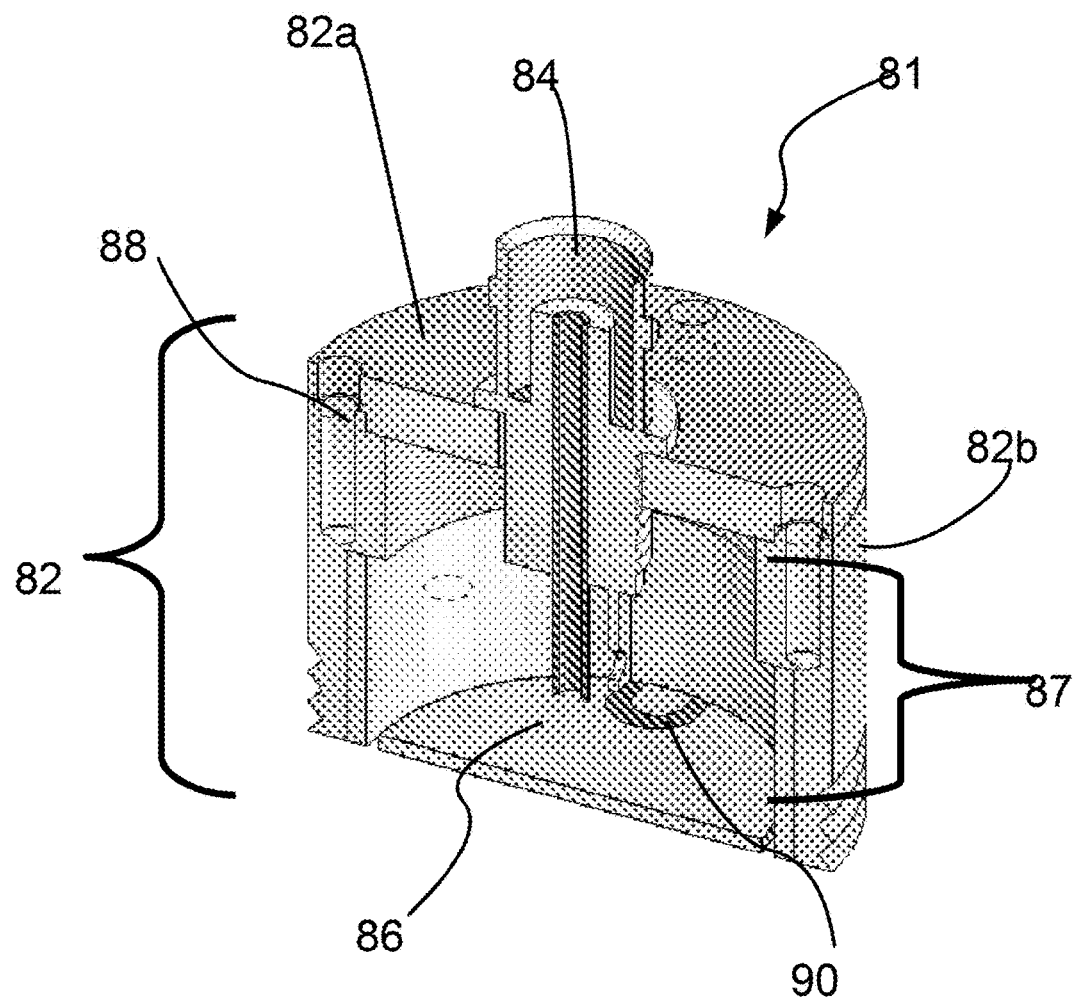
FIG. 7 is a cross-sectional diagram of an ultrasonic transducer of the present disclosure. An air gap is present within the transducer, and no backing layer is present.

FIG. 7 is a cross-sectional view of an ultrasonic transducer 81 of the present disclosure, which can be used with the acoustophoretic separators of FIG. 1 and FIG. 3. Transducer 81 has an aluminum housing 82. A PZT crystal 86 defines the bottom end of the transducer, and is exposed from the exterior of the housing. The crystal is supported on its perimeter by the housing.

Screws (not shown) attach an aluminum top plate 82a of the housing to the body 82b of the housing via threads 88. The top plate includes a connector 84 to pass power to the PZT crystal 86. Electrical power is provided to the PZT crystal 86 by electrical lead 90. Note that the crystal 86 has no backing layer as is present in FIG. 5. Put another way, there is an air gap 87 in the transducer between aluminum top plate 82a and the crystal 86. A minimal backing may be provided in some embodiments.

The transducer design can affect performance of the system. A typical transducer is a layered structure with the ceramic crystal bonded to a backing layer and a wear plate. Because the transducer is loaded with the high mechanical impedance presented by the standing wave, the traditional design guidelines for wear plates, e.g., half or quarter wavelength thickness, and manufacturing methods may not be appropriate. Rather, in one embodiment of the present disclosure the transducers, there is no wear plate or backing, allowing the crystal to vibrate with a high Q-factor. The vibrating ceramic crystal/disk is directly exposed to the fluid flowing through the flow chamber.

Removing the backing (e.g. making the crystal air backed) also permits the ceramic crystal to obtain higher order modes of vibration (e.g. higher order modal displacement). In a transducer having a crystal with a backing, the crystal vibrates with a uniform displacement, like a piston. Removing the backing allows the crystal to vibrate in a non-uniform displacement mode. The higher order the mode shape of the crystal, the more nodal lines the crystal has. The higher order modal displacement of the crystal creates more trapping lines, although the correlation of trapping line to node is not necessarily one to one, and driving the crystal at a higher frequency will not necessarily produce more trapping lines. See the discussion below with respect to FIGS. 19-22.

In some embodiments, the crystal may have a backing that minimally affects the Q-factor of the crystal (e.g. less than 5%). The backing may be made of a substantially acoustically transparent material such as balsa wood or cork which allows the crystal to vibrate in a higher order mode shape and maintains a high Q-factor while still providing some mechanical support for the crystal. In another embodiment, the backing may be a lattice work that follows the nodes of the vibrating crystal in a particular higher order vibration mode, providing support at node locations while allowing the rest of the crystal to vibrate freely. The goal of the lattice work or acoustically transparent material is to provide support without lowering the Q-factor of the crystal.

Placing the crystal in direct contact with the fluid also contributes to the high Q-factor by avoiding the dampening and energy absorption effects of the wear plate. Other embodiments may have wear plates or a wear surface to prevent the PZT, which contains lead, contacting the host fluid. This may be desirable in, for example, biological applications such as separating blood. Such applications might use a wear layer such as chrome, electrolytic nickel, or electroless nickel. Chemical vapor deposition could also be used to apply a layer of poly(p-xylxyene) (e.g. Parylene) or other polymer. Organic and biocompatible coatings such as silicone or polyurethane are also contemplated as a wear surface.

In the present systems, the system is operated at a voltage such that the particles are trapped in the ultrasonic standing wave, i.e., remain in a stationary position. The particles are collected in along well defined trapping lines, separated by half a wavelength. Within each nodal plane, the particles are trapped in the minima of the acoustic radiation potential. The axial component of the acoustic radiation force drives the particles, with a positive contrast factor, to the pressure nodal planes, whereas particles with a negative contrast factor are driven to the pressure anti-nodal planes. The radial or lateral component of the acoustic radiation force is the force that traps the particle. In systems using typical transducers, the radial or lateral component of the acoustic radiation force is typically several orders of magnitude smaller than the axial component of the acoustic radiation force. On the contrary, the lateral force in separators 1 and 30 can be significant, on the same order of magnitude as the axial force component, and is sufficient to overcome the fluid drag force at linear velocities of up to 1 cm/s. As discussed above, the lateral force can be increased by driving the transducer in higher order mode shapes, as opposed to a form of vibration where the crystal effectively moves as a piston having a uniform displacement. These higher order modes of vibration are similar to the vibration of a membrane in drum modes such as modes (1,1), (1,2), (2,1), (2,2), (2, 3), or (m, n), where m and n are 1 or greater. The acoustic pressure is proportional to the driving voltage of the transducer. The electrical power is proportional to the square of the voltage.

Figure 8:
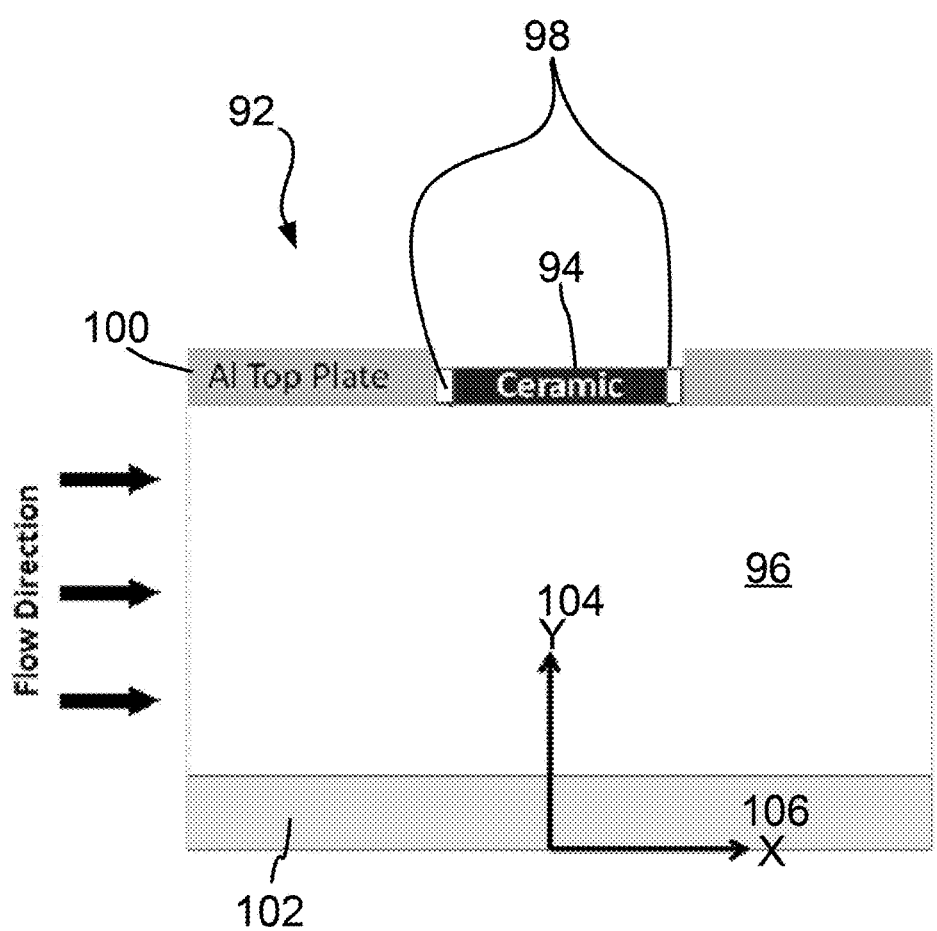
FIG. 8 is a computer model of an acoustophoretic separator simulated to generate FIGS. 9-17 and 31-33.

FIG. 8 is a computer model of an acoustophoretic separator 92 simulated to produce FIGS. 9-17. The piezo ceramic crystal 94 is in direct contact with the fluid in the water channel 96. A layer of silicon 98 is between the crystal 94 and the aluminum top plate 100. A reflector 102 reflects the waves to create standing waves. The reflector is made of a high acoustic impedance material such as steel or tungsten, providing good reflection. For reference, the Y-axis 104 will be referred to as the axial direction. The X-axis 106 will be referred to as the radial or lateral direction. The acoustic pressure and velocity models were calculated in COMSOL including piezo-electric models of the PZT transducer, linear elastic models of the surrounding structure (e.g. reflector plate and walls), and a linear acoustic model of the waves in the water column. The acoustic pressure and velocity was exported as data to MATLAB. The radiation force acting on a suspended particle was calculated in MATLAB using Gor'kov's formulation. The particle and fluid material properties, such as density, speed of sound, and particle size, are entered into the program, and used to determine the monopole and dipole scattering contributions. The acoustic radiation force is determined by performing a gradient operation on the field potential U, which is a function of the volume of the particle and the time averaged potential and kinetic energy of the acoustic field.

Figure 9:
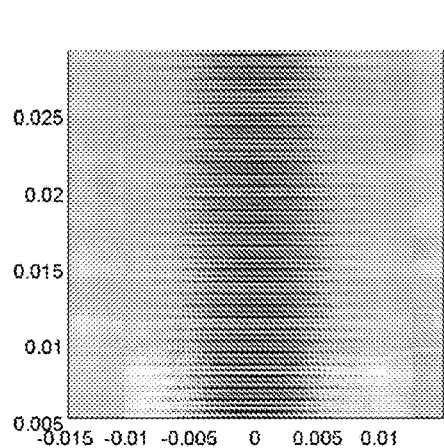
FIG. 9 shows a simulation of the axial forces on a particle in an acoustophoretic separator having a piezoelectric crystal producing a single standing wave.
Figure 31:
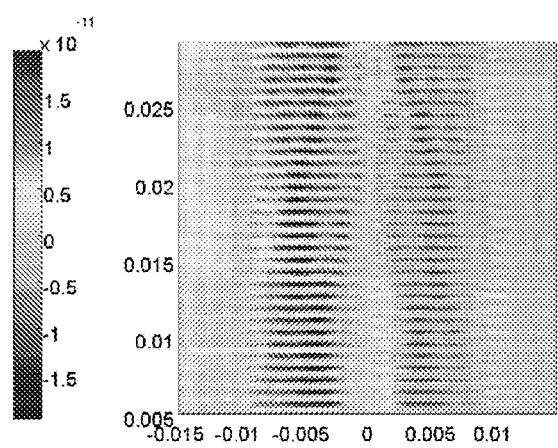
FIG. 31 shows a simulation of the lateral forces on a particle in an acoustophoretic separator having a piezoelectric crystal producing a single standing wave.
Figure 32:
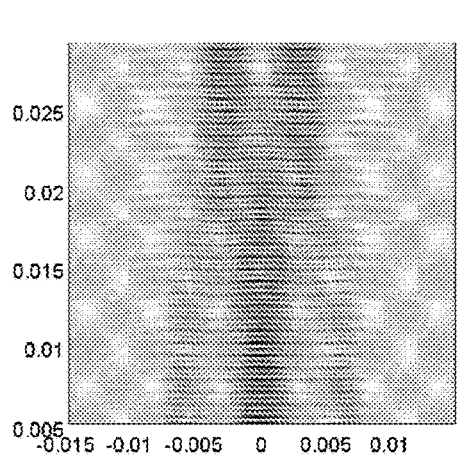
FIG. 32 shows a simulation of the axial forces on a particle in an acoustophoretic separator having a piezoelectric crystal in a multi-mode excitation.
Figure 33:
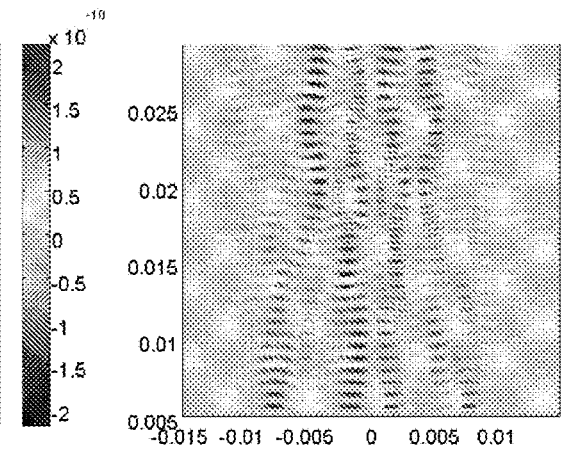
FIG. 33 shows a simulation of the lateral forces on a particle in an acoustophoretic separator a piezoelectric crystal in a multi-mode excitation.

FIGS. 9 and 31-33 show simulations of the difference in trapping between a single acoustic wave and a multimode acoustic wave. FIG. 9 shows the axial force associated with a single standing acoustic wave. FIG. 31 shows the lateral force due to a single standing acoustic wave. FIGS. 32 and 33 show the axial force and lateral force, respectively, in a multi-mode (higher order vibration modes having multiple nodes) piezoelectric crystal excitation where multiple standing waves are formed. The electrical input is the same as the single mode of FIGS. 9 and 31, but the trapping force (lateral force) is 70 times greater (note the scale to the right in FIG. 31 compared to 33). The figures were generated by a computer modeling simulation of a 1 MHz piezo-electric transducer driven by 10 V AC potted in an aluminum top plate in an open water channel terminated by a steel reflector (see FIG. 8). The field in FIGS. 9 and 31 is 960 kHz with a peak pressure of 400 kPa. The field in FIGS. 32 and 33 is 961 kHz with a peak pressure of 1400 kPa. In addition to higher forces, the 961 kHz field (FIGS. 32 and 33) has more gradients and focal spots.

Figure 10:
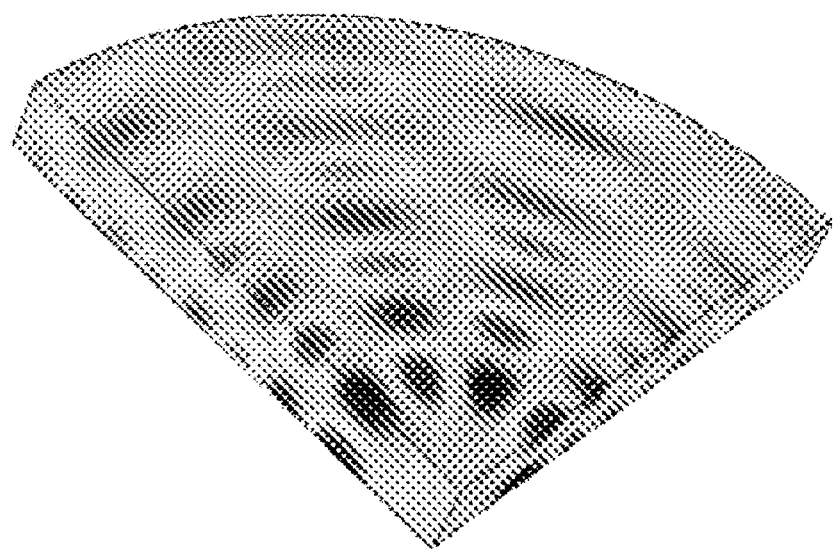
FIG. 10 shows a three dimensional computer generated model of a mode shape calculation for a circular crystal driven at a frequency of 1 MHz.

FIG. 10 shows a three dimensional computer generated model of a mode shape calculation for a circular crystal driven at a frequency of 1 MHz.

FIGS. 11-17 are based on the model of FIG. 8 with a PZT-8 piezo-electric transducer operating at 2 MHz. The transducer is 1" wide and 0.04" thick, potted in an aluminum top plate (0.125" thick) in a 4"×2" water channel terminated by a steel reflector plate (0.180" thick). The acoustic beam spans a distance of 2". The depth dimension, which is 1", is not included in the 2D model. The transducer is driven at 15V and a frequency sweep calculation is done to identify the various acoustic resonances. The results of the three consecutive acoustic resonance frequencies, i.e., 1.9964 MHz (FIGS. 11, 12, and 13), 2.0106 MHz (FIGS. 14 and 15), and 2.025 MHz (FIGS. 16 and 17), are shown. The acoustic radiation force is calculated for an oil droplet with a radius of 5 micron, a density of 880 kg/m$^3$, and speed of sound of 1700 m/sec. Water is the main fluid with a density of 1000 kg/m$^3$, speed of sound of 1500 m/sec, and dynamic viscosity of 0.001 kg/msec. FIG. 11 shows the lateral (horizontal) acoustic radiation force. FIG. 12 shows the axial (vertical) component for a resonance frequency of 1.9964 MHz. FIG. 13 shows the acoustic pressure amplitude.

FIGS. 11 and 12 show that the relative magnitude of the lateral and axial component of the radiation force are very similar, about 1.2e-10 N, indicating that it is possible to create large trapping forces, where the lateral force component is of similar magnitude or higher than the axial component. This is a new result and contradicts typical results mentioned in the literature.

A second result is that the acoustic trapping force magnitude exceeds that of the fluid drag force, for typical flow velocities on the order of mm/s, and it is therefore possible to use this acoustic field to trap the oil droplet. Of course, trapping at higher flow velocities can be obtained by increasing the applied power to the transducer. That is, the acoustic pressure is proportional to the driving voltage of the transducer. The electrical power is proportional to the square of the voltage.

A third result is that at the frequency shown, high trapping forces associated with this particular trapping mode extend across the entire flow channel, thereby enabling capture of oil droplets across the entire channel width. Finally, a comparison of the minima of the acoustic trapping force field, i.e., the locations of the trapped particles, with the observed trapping locations of droplets in the standing wave shows good agreement, indicating that COMSOL modeling is indeed an accurate tool for the prediction of the acoustic trapping of particles. This will be shown in more detail below.

Figure 14:
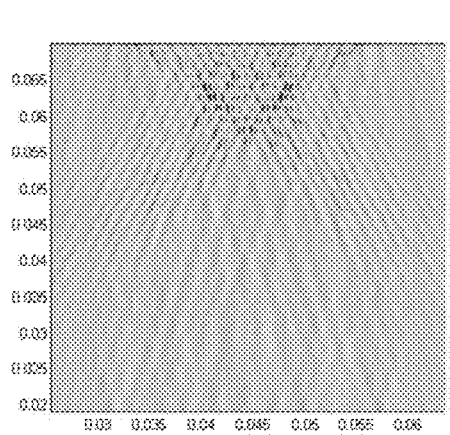
FIG. 14 shows the lateral force component at a resonance frequency of 2.0106 MHz.
Figure 15:
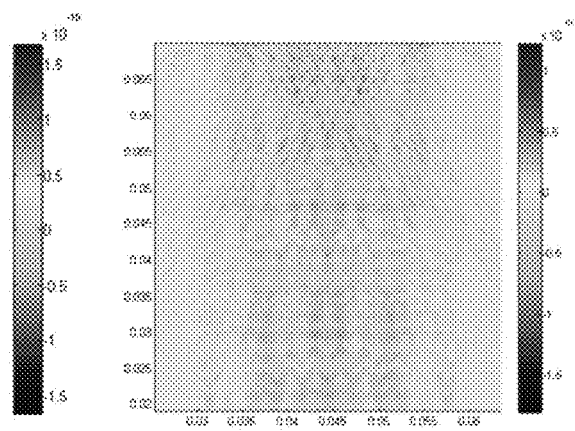
FIG. 15 shows the axial acoustic radiation force component at a resonance frequency of 2.0106 MHz.

FIG. 14 shows the lateral force component at a resonance frequency of 2.0106 MHz, and FIG. 15 shows the axial acoustic radiation force component at a resonance frequency of 2.0106 MHz. FIGS. 14 and 15 exhibit higher peak trapping forces than FIGS. 11 and 12. The lateral acoustic radiation forces exceed the axial radiation force. However, the higher trapping forces are located in the upper part of the flow channel, and do not span the entire depth of the flow channel. It would therefore represent a mode that is effective at trapping particles in the upper portion of the channel, but not necessarily across the entire channel. Again, a comparison with measured trapping patterns indicates the existence of such modes and trapping patterns.

Figure 16:
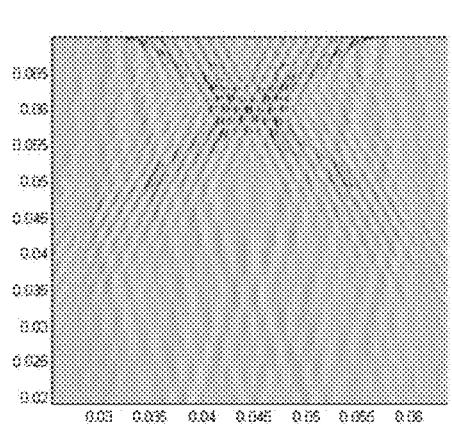
FIG. 16 shows the lateral force component at a resonance frequency of 2.025 MHz.
Figure 17:
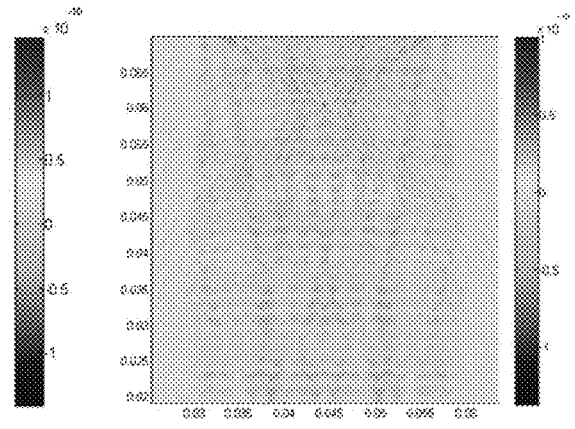
FIG. 17 shows the axial acoustic radiation force component at a resonance frequency of 2.025 MHz.

FIG. 16 shows the lateral force component at a resonance frequency of 2.025 MHz, and FIG. 17 shows the axial acoustic radiation force component at a resonance frequency of 2.025 MHz. The acoustic field changes drastically at each acoustic resonance frequency, and therefore careful tuning of the system is critical. At a minimum, 2D models are necessary for accurate prediction of the acoustic trapping forces.

2D axisymmetric models were developed to calculate the trapping forces for circular transducers. The models were used to predict acoustic trapping forces on particles, which can then be used to predict particle trajectories in combination with the action of fluid drag and buoyancy forces. The models clearly show that it is possible to generate lateral acoustic trapping forces necessary to trap particles and overcome the effects of buoyancy and fluid drag. The models also show that circular transducers do not provide for large trapping forces across the entire volume of the standing wave created by the transducer, indicating that circular transducers only yield high trapping forces near the center of the ultrasonic standing wave generated by the transducer, but provide much smaller trapping forces toward the edges of the standing wave. This further indicates that the circular transducer only provides limited trapping for a small section of the fluid flow that would flow across the standing wave of the circular transducer, and no trapping near the edges of the standing wave.

Figure 18:
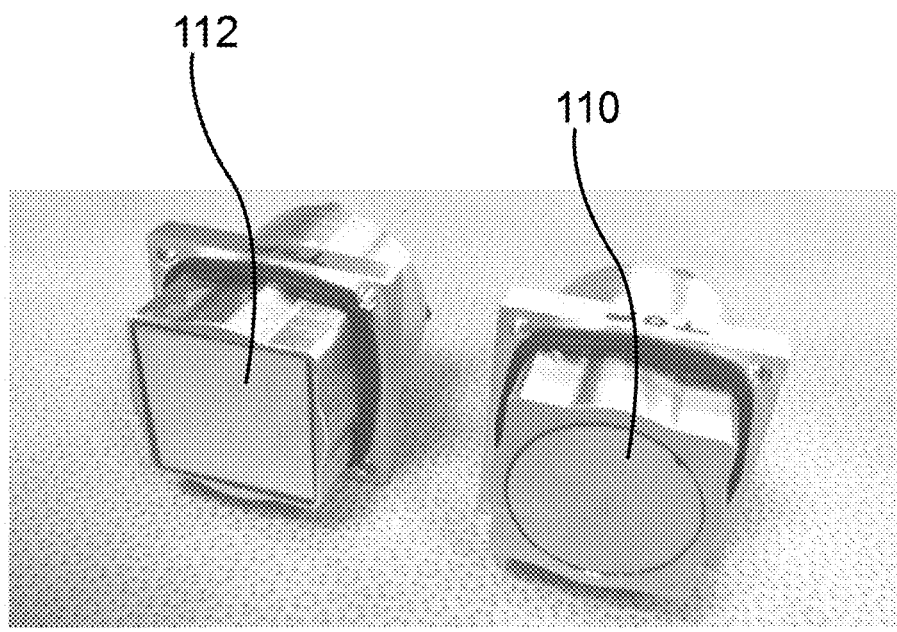
FIG. 18 is a photo of a square transducer and a circular transducer for use in an acoustophoretic separator.

Because the circular transducers do not provide for large trapping forces across the entire volume, the effect of transducer shape on oil separation efficiency was investigated. A 1"-diameter circular PZT-8 crystal (FIG. 18, 110) and a 1"×1" square crystal (FIG. 18, 112) were used. Otherwise the experiment was run at identical conditions. Table 1 shows the results.

TABLE 1

Results of Investigation of Round and Square Transducer Shape

| Transducer Shape | Total Power Input (Watts) | Flowrate (ml/min) | Duration (min) | Capture Efficiency (%) |
|---|---|---|---|---|
| Round | 20 | 500 | 45 | 59% |
| Square | 20 | 500 | 30 | 91% |

The results indicate that the square transducer 112 provides better oil separation efficiencies than the round transducer 110, explained by the fact that the square transducer 112 provides better coverage of the flow channel with acoustic trapping forces, and that the round transducer only provides strong trapping forces along the centerline of the standing wave, confirming the findings of the numerical simulations.

Figure 19:
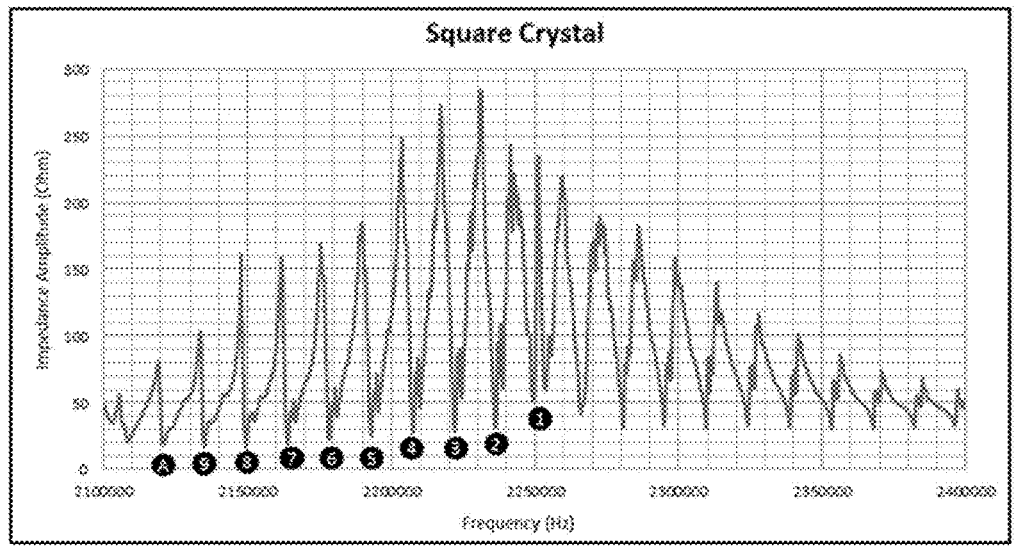
FIG. 19 is a graph of impedance amplitude versus frequency as a square transducer is driven at different frequencies.

In addition to the shape of the transducer, the shape of the mode of the transducer (in what shape the transducer is vibrating) affects oil separation efficiency. Producing more nodes provides more places for oil to be trapped. FIG. 19 shows the measured electrical impedance amplitude of the transducer as a function of frequency in the vicinity of the 2.2 MHz transducer resonance. The minima in the transducer impedance correspond to acoustic resonances of the water column and represent potential frequencies for operation. Numerical modeling has indicated that the transducer displacement profile varies significantly at these acoustic resonance frequencies, and thereby directly affects the acoustic standing wave and resulting trapping force. The transducer displacement mode shape varies from a single half wavelength mode to a three half wavelength mode shape. Higher order transducer modal displacement patterns result in higher trapping forces and multiple stable trapping locations for the captured oil droplets. A single half wavelength mode results in one line of trapped droplets, whereas a three half wavelength mode results in three parallel lines of trapped droplets across the fluid channel.

To investigate the effect of transducer mode shape on acoustic trapping force and oil separation efficiencies, an experiment was repeated ten times, with all conditions identical except for the excitation frequency. Ten consecutive acoustic resonance frequencies, indicated by circled numbers 1-9 and letter A on FIG. 19, were used as excitation frequencies. The conditions were experiment duration of 30 min, a 1000 ppm oil concentration, a flow rate of 500 ml/min, and an applied power of 20 W.

Figure 20:
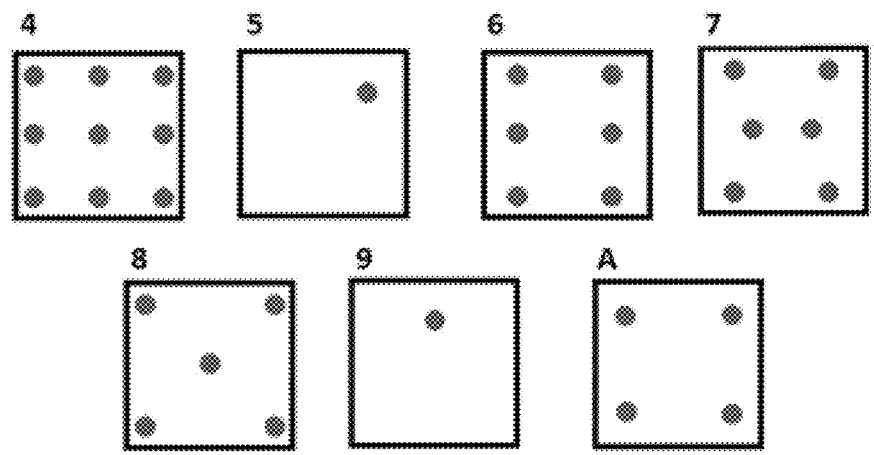
FIG. 20 illustrates the node configurations for seven of the peak amplitudes of FIG. 19.

As the emulsion passed by the transducer, the trapping nodal lines were observed and characterized. The characterization involved the observation and pattern of the number of nodal trapping lines across the fluid channel, as shown in FIG. 20, for seven of the ten resonance frequencies identified in FIG. 19.

The effect of excitation frequency clearly determines the number of nodal trapping lines, which vary from a single trapping line at the excitation frequency of acoustic resonance 5 and 9, to nine trapping nodal lines for acoustic resonance frequency 4. At other excitation frequencies four or five nodal trapping lines are observed. These experimentally observed results confirm the results expected from the differences when FIGS. 9 and 31 are compared to FIGS. 32 and 33. Different modes of vibration of the transducer can produce different (more) nodes of the standing waves, with more nodes generally creating higher trapping forces.

Table 2 summarizes the findings from an oil trapping experiment using a system similar to FIG. 1. An important conclusion is that the oil separation efficiency of the acoustic separator is directly related to the mode shape of the transducer. Higher order modal displacements generate larger acoustic trapping forces and more trapping nodal lines resulting in better efficiencies. A second conclusion, useful for scaling studies, is that the tests indicate that capturing 5 micron oil droplets at 500 ml/min requires 10 Watts of power per square-inch of transducer area per 1" of acoustic beam span. The main dissipation is that of thermo-viscous absorption in the bulk volume of the acoustic standing wave. The cost of energy associated with this flow rate is 0.667 kWh per cubic meter.

TABLE 2

Trapping Pattern Capture Efficiency Study

| Resonance Peak Location | Total Power Input (Watts) | # of Trapping Nodes | Flowrate (ml/min) | Duration (min) | Capture Efficiency (%) |
|---|---|---|---|---|---|
| 4 | 20 | 9 | 500 | 30 | 91% |
| 8 | 20 | 5 | 500 | 30 | 58% |
| A | 20 | 4 | 500 | 30 | 58% |
| 9 | 20 | 2 | 500 | 30 | 37% |

Figure 21:
FIG. 21 is a photo of the nine-node configuration of a transducer.
Figure 22:
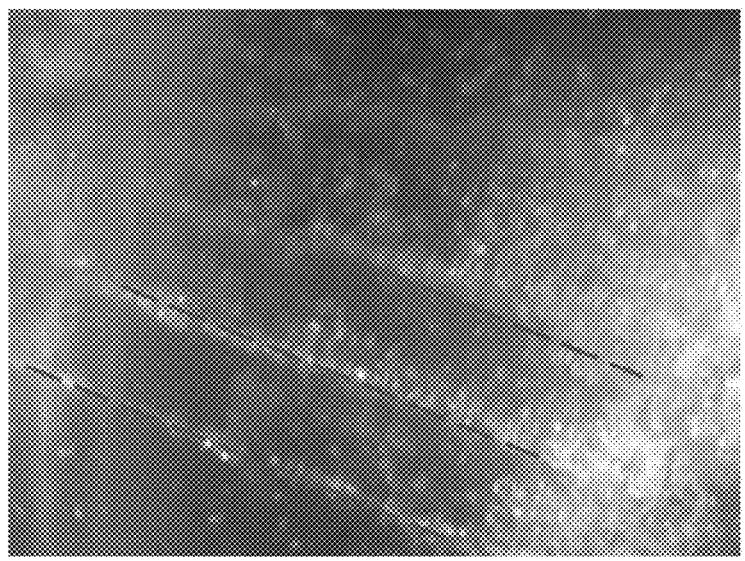
FIG. 22 is a photo of another multi-nodal configuration of a transducer.
Figure 23:
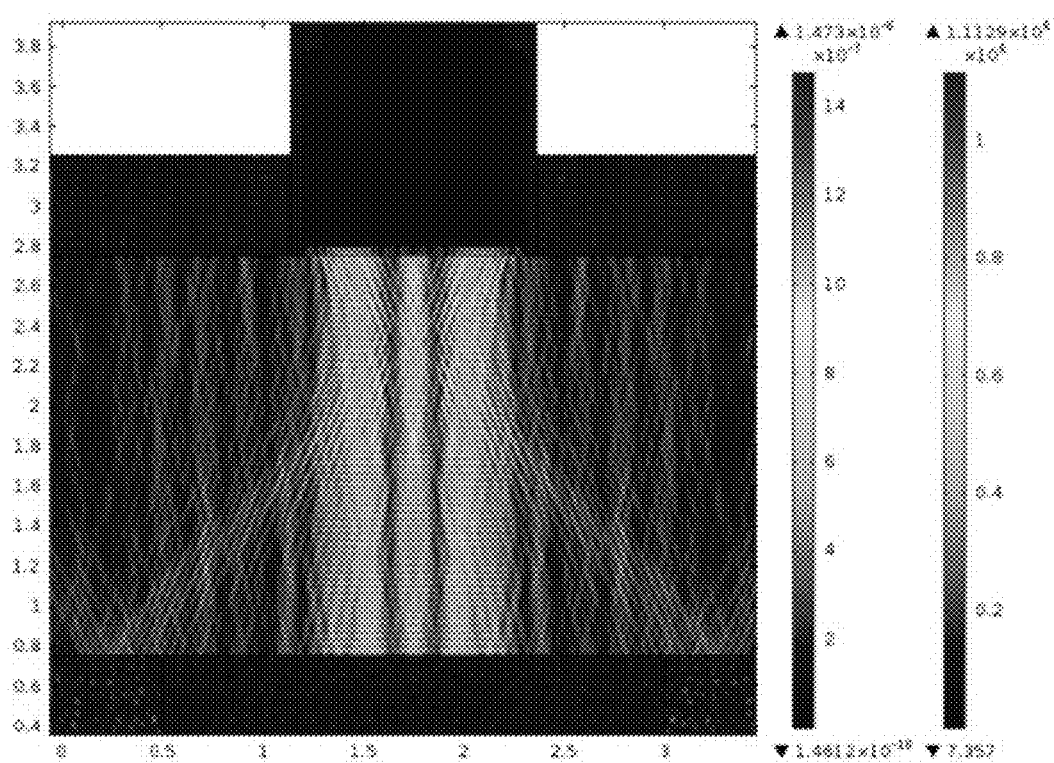
FIG. 23 is a computer simulation of the forces from a transducer.

FIGS. 21 and 22 show photos of the trapped oil droplets in the nine trapping nodal line pattern. Dashed lines are superimposed over the nodal lines. FIG. 23 shows the pressure field, calculated in COMSOL that matches the 9 trapping nodal line pattern. The numerical model is a two-dimensional model; and therefore only three trapping columns are observed. Two more sets of three trapping columns exist in the third dimension perpendicular to the plane of the 2D model of FIGS. 21 and 22. This comparison indicates that the numerical model is accurate in predicting the nature of the ultrasonic standing wave and the resulting trapping forces, again confirming the results expected from the differences when FIGS. 9 and 31 are compared to FIGS. 32 and 33.

Figure 24:
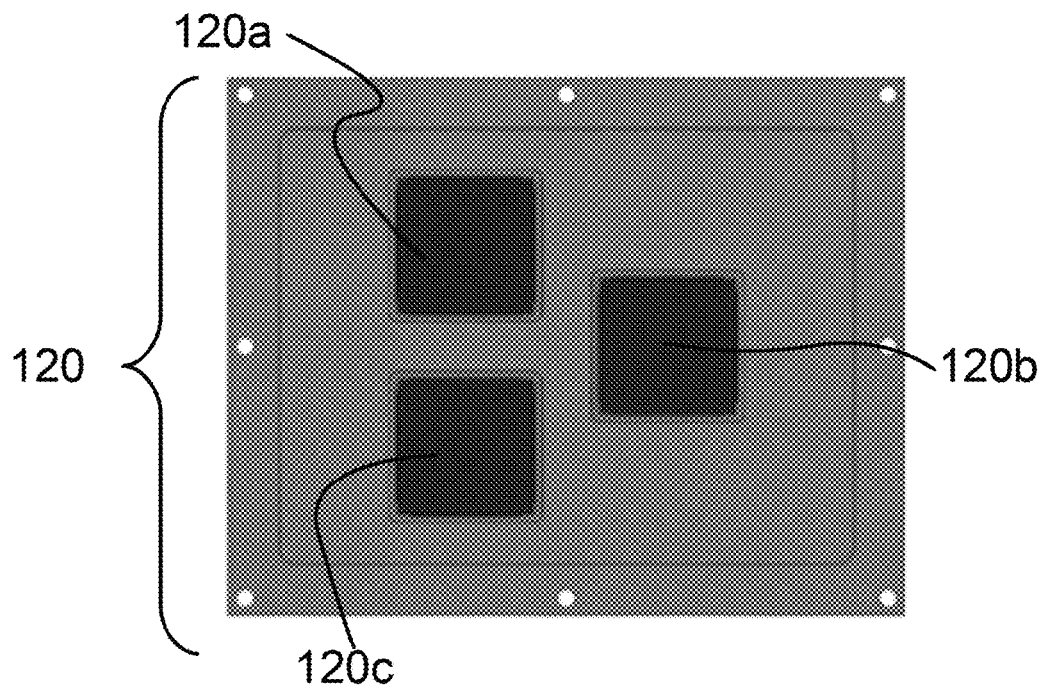
FIGS. 24 and 25 show transducer array configurations.
Figure 25:
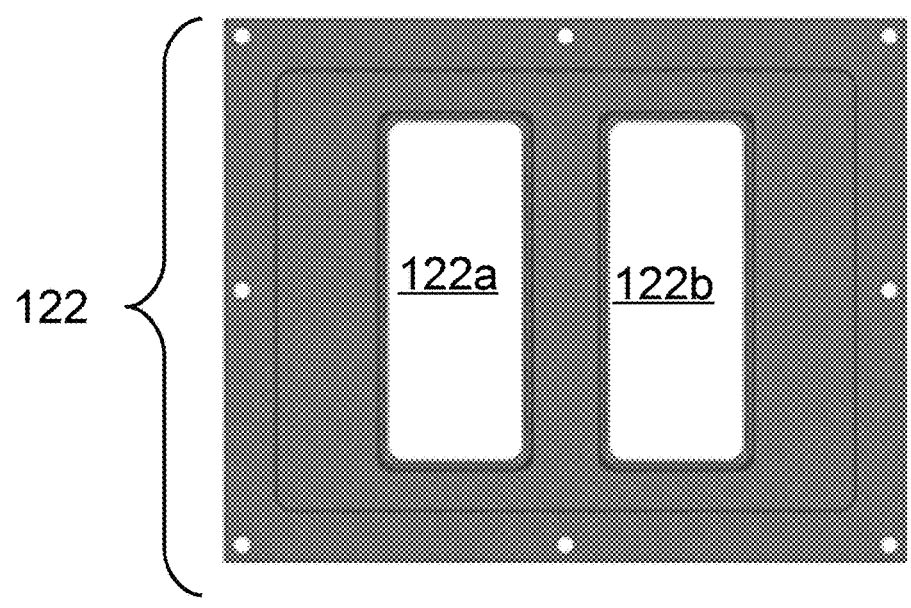

In larger systems, different transducer arrangements are feasible. FIG. 24 shows a transducer array 120 including three square 1"×1" crystals 120a, 120b, 120c. Two squares are parallel to each other, and the third square is offset to form a triangular pattern. FIG. 25 shows a transducer array 122 including two rectangular 1"×2.5" crystals 122a, 122b arranged with their long axes parallel to each other. Power dissipation per transducer was 10 W per 1"×1" transducer cross-sectional area and per inch of acoustic standing wave span in order to get sufficient acoustic trapping forces. For a 4" span of an intermediate scale system, each 1"×1" square transducer consumes 40 W. The larger 1"×2.5" rectangular transducer uses 100 W in an intermediate scale system. The array of three 1"×1" square transducers would consume a total of 120 W and the array of two 1"×2.5" transducers would consume about 200 W.

Figure 26:
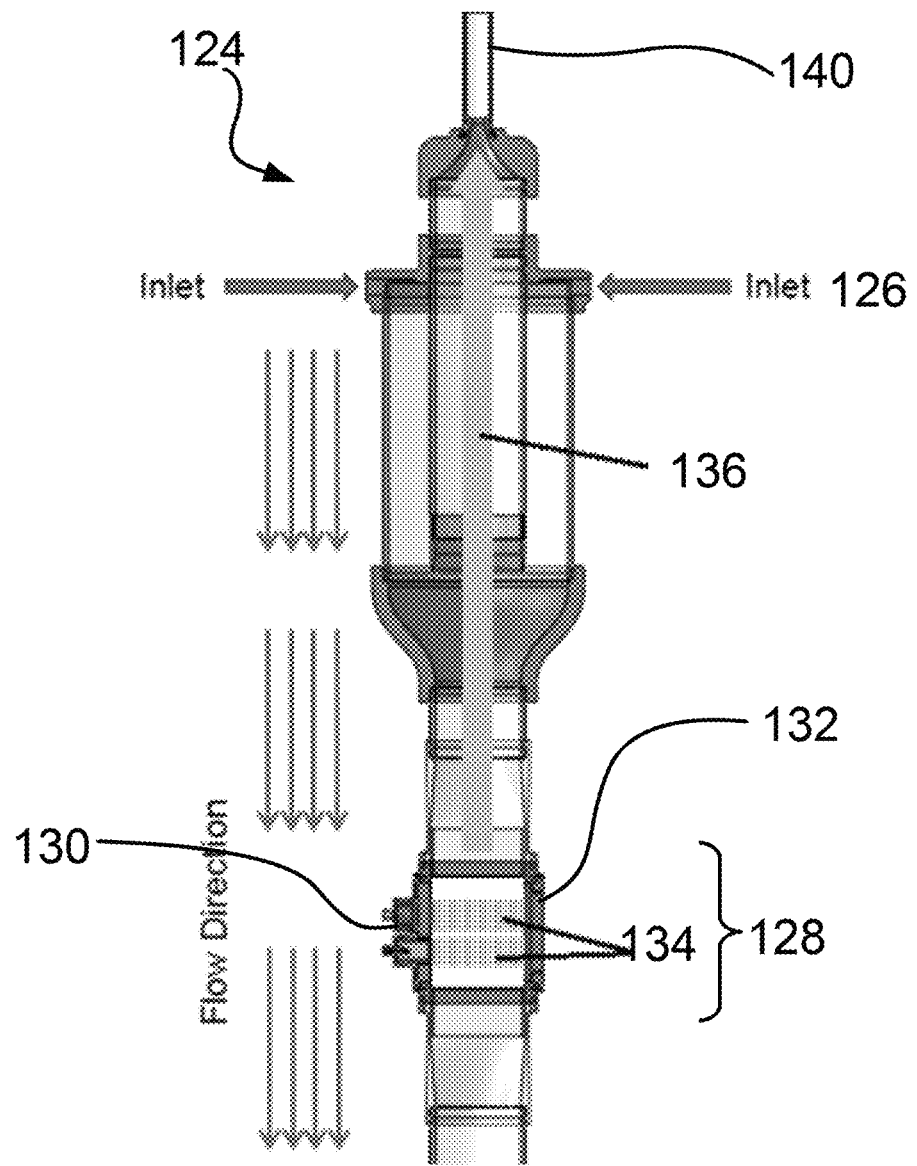
FIG. 26 shows an acoustophoretic separator for separating buoyant materials for use with the transducers of FIGS. 21 and 22.

A 4" intermediate scale system 124 for separating a host fluid from a buoyant fluid or particulate is shown in FIG. 26. Host fluid enters inlet 126 and flows down to the separator 128, which includes a transducer array 130, and reflector 132. The separator creates standing waves 134 to agglomerate buoyant fluid or particulate (e.g. oil). The buoyant force 136 carries the buoyant material to the collection chamber 140.

Transducer array 120 was installed in system 124, removed, and then transducer array 122 installed. The arrays were operated in parallel such that each transducer was driven by the same voltage signal from the amplifier. The electronic drive circuit consisted of a function generator and a 300 W A300 ENI RF amplifier. The results of the testing are shown in Table 3. The first test used only the two of the 1"×1" square transducers or array 120, oriented parallel to each other, and was run at a flow rate of 1300 ml/min. It resulted in an oil separation efficiency of 88%. The next test involved all three square transducers and a flow rate of 2000 ml/min, and yielded an efficiency of 93%. These results are excellent and demonstrate that the technology is scalable to larger flow channels driven by arrays of transducers. The next set of tests involved the 1"×2.5" rectangular transducer array 122. For the first test, only one transducer was run and yielded an efficiency of 87%. The second test with both transducers operating yielded an efficiency of 97%. For the 1"×2.5" transducers, the power level that was used was based on operating the transducer at safe levels. For these tests, the cost of energy for the intermediate system is 1 kWh per cubic meter.

TABLE 3

Intermediate System Test Results

| Transducer Configuration | Number of Transducers Active | Total Power Input (Watts) | Flowrate (ml/min) | Duration (min) | Capture Efficiency (%) |
|---|---|---|---|---|---|
| 1" × 1" Transducers | 2 | 80 | 1300 | 15 | 88% |

TABLE 3-continued

Intermediate System Test Results

| Transducer Configuration | Number of Transducers Active | Total Power Input (Watts) | Flowrate (ml/min) | Duration (min) | Capture Efficiency (%) |
|---|---|---|---|---|---|
| 1" × 1" Transducers | 3 | 120 | 2000 | 15 | 93% |
| 1" × 2.5" Transducers | 1 | 100 | 2000 | 8 | 87% |
| 1" × 2.5" Transducers | 2 | 100 | 1000 | 15 | 97% |

Figure 27:
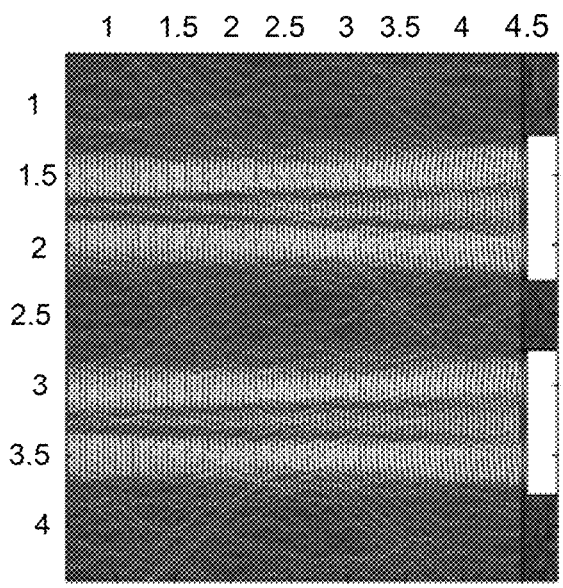
FIG. 27 is a computer simulation of the forces from an array of transducers.
Figure 28:
FIG. 28 is a photo showing the nodes of an array of transducers.
Figure 29:
FIG. 29 is a photo showing the nodes of an array of transducers.
Figure 30:
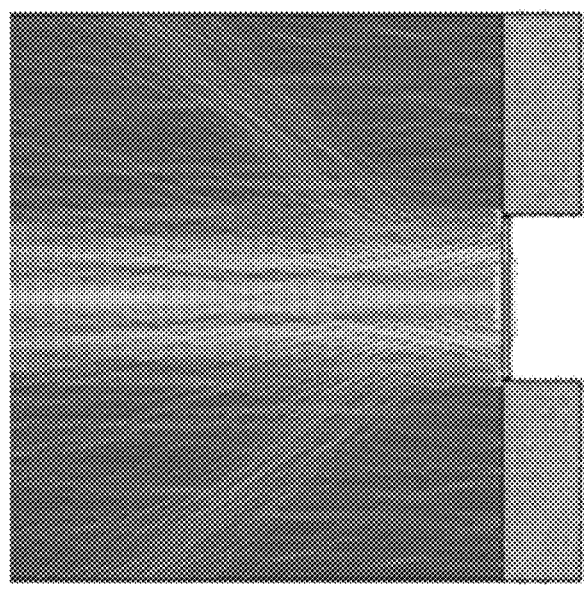
FIG. 30 is a computer simulation of the forces from an array of transducers.

Numerical modeling was also done for the intermediate sized system with a span of 4" for the acoustic standing wave. Multiple transducers were modeled to investigate the coupling effect between transducers. Frequency sweeps were performed and the resonance frequencies for which the acoustic mode shapes couple strongly to the higher order mode shapes of the transducer were identified. The comparisons between numerical and experimental results are excellent and demonstrate the accuracy of the models. FIG. 27 shows the acoustic pressure field of a model with two transducers on the right side. A photograph of the trapped oil droplets in the standing wave is shown in FIG. 28. Both experiment and model show identical features. At certain excitation frequencies, oil droplets were trapped in the standing wave well outside the fluid volume defined by the transducer area, indicating an expanded acoustic field with strong trapping forces. FIG. 29 shows a photograph of such trapped oil droplets. FIG. 30 shows an acoustic pressure field model which predicts identical features.

The present disclosure has been described with reference to exemplary embodiments. Obviously, modifications and alterations will occur to others upon reading and understanding the preceding detailed description. It is intended that the present disclosure be construed as including all such modifications and alterations insofar as they come within the scope of the appended claims or the equivalents thereof.

The invention claimed is:

1. A method of separating impurities from a host fluid, the method comprising:
providing a flow chamber with a source of acoustic energy that includes an initial shape, and, on an opposing side of the flow chamber, a reflector of acoustic energy;
flowing the host fluid through the flow chamber;
driving the source of acoustic energy at a frequency that generates a higher order mode shape than the initial shape to generate a three-dimensional ultrasonic standing wave in the host fluid, wherein the three-dimensional ultrasonic standing wave results in an acoustic radiation force that includes an axial component and a lateral component that are of the same order of magnitude;
trapping the impurities in the three-dimensional ultrasonic standing wave against the flowing host fluid with the acoustic radiation force;
coalescing or agglomerating the impurities with the acoustic radiation force such that the impurities are concentrated and grow in size; and
growing the concentrated impurities in size until the gravitational or buoyancy forces on the concentrated impurities overcome at least the acoustic radiation force on the concentrated impurities such that they exit the three-dimensional ultrasonic standing wave.

2. The method of claim 1, wherein the host fluid is continuously flowed through the flow chamber.

3. The method of claim 1, wherein the standing wave creates nodal lines and the lateral component traps the impurities in the nodal lines.

4. The method of claim 1, further comprising driving the impurities to pressure nodal or anti-nodal planes to permit the impurities to coalesce or agglomerate.

5. The method of claim 1, wherein:
the flow chamber has an inlet and an outlet;
the source of acoustic energy is an ultrasonic transducer on a wall of the flow chamber, the transducer including a ceramic crystal that defines a side of the transducer, the transducer being driven by an oscillating, periodic, or pulsed voltage signal at an ultrasonic resonance frequency which drives the transducer to create the three-dimensional ultrasonic standing waves in the flow chamber; and
the reflector of acoustic energy is located on a wall on the opposite side of the flow chamber from the transducer.

6. The method of claim 5, wherein the crystal is driven in a non-uniform displacement mode.

7. The method of claim 6, wherein the crystal is driven in a higher order mode shape having more than one nodal trapping line.

8. The method of claim 5, wherein the ceramic crystal of the transducer is directly exposed to the host fluid flowing through the flow chamber.

9. The method of claim 5, wherein the ceramic crystal is made of PZT-8.

10. The method of claim 5, wherein the transducer has a housing containing the ceramic crystal.

11. The method of claim 10, wherein the housing includes a top and an air gap, the air gap being disposed between the top and the ceramic crystal.

12. The method of claim 11, wherein the ceramic crystal does not have a backing layer.

13. The method of claim 5, wherein the flow chamber has a collection pocket in a wall of the flow chamber.

14. The method of claim 5, wherein the reflector of acoustic energy is steel or tungsten.

15. The method of claim 5, wherein the flow chamber further includes a diffuser at the inlet.

16. The method of claim 15, wherein the diffuser has a grid device for uniform flow.

17. The method of claim 5, wherein the ceramic crystal is square.

18. The method of claim 5, wherein the crystal is backed by a substantially acoustically transparent material.

19. The method of claim 18, wherein the substantially acoustically transparent material is balsa wood or cork.

20. The method of claim 5, wherein the ultrasonic transducer has a face that contacts the host fluid, the face coated with a wear layer comprising one of chrome, electrolytic nickel, or electroless nickel, p-xylylene, and urethane.

21. A process for separating a second fluid or particulate from a host fluid, comprising:
flowing the host fluid containing the second fluid or particulate through an apparatus comprising:
a flow chamber that includes an inlet and an outlet;
an ultrasonic transducer with an initial shape coupled to the flow chamber; and
a reflector on an opposite side of the flow chamber from the ultrasonic transducer; and
driving the ultrasonic transducer at a frequency that generates a higher order mode shape than the initial shape to generate a three-dimensional ultrasonic standing wave in the flow chamber, wherein the three-dimensional ultrasonic standing wave results in an acoustic radiation force that includes an axial component and a lateral component that are of the same order of magnitude;
wherein the second fluid or particulate is trapped in the three-dimensional ultrasonic standing wave and separated from the host fluid.

22. The method of claim 21, further comprising driving the second fluid or particulate to pressure nodal or anti-nodal planes to permit the second fluid or particulate to coalesce or agglomerate.

* * * * *